United States Patent
Wang et al.

(10) Patent No.: US 10,917,778 B2
(45) Date of Patent: Feb. 9, 2021

(54) COMMUNICATION RESOURCE ALLOCATION METHOD AND APPARATUS, TERMINAL DEVICE, BASE STATION, AND COMMUNICATIONS SYSTEM

(71) Applicant: Huawei Technologies Co., Ltd., Shenzhen (CN)

(72) Inventors: Hong Wang, Beijing (CN); Zhenzhen Cao, Beijing (CN); Jian Zhang, Beijing (CN); Wei Quan, Beijing (CN); Li Chai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/054,345

(22) Filed: Aug. 3, 2018

(65) Prior Publication Data
US 2018/0343556 A1    Nov. 29, 2018

Related U.S. Application Data

(63) Continuation of application No. PCT/CN2016/073663, filed on Feb. 5, 2016.

(51) Int. Cl.
*H04W 8/00* (2009.01)
*H04W 76/14* (2018.01)
(Continued)

(52) U.S. Cl.
CPC .......... *H04W 8/005* (2013.01); *H04W 4/06* (2013.01); *H04W 28/26* (2013.01); *H04W 40/00* (2013.01);
(Continued)

(58) Field of Classification Search
None
See application file for complete search history.

(56) References Cited

U.S. PATENT DOCUMENTS 9,445,352 B2 *   9/2016   Wu ..................... H04W 48/08
9,584,985 B2 *   2/2017   Wu ....................... H04W 4/80
(Continued)

FOREIGN PATENT DOCUMENTS

CN    104105155 A    10/2014
CN    104918233 A    9/2015
(Continued)

OTHER PUBLICATIONS

"3rd Generation Partnership Project;Technical Specification Group Radio Access Network; Evolved Universal Terrestrial Radio Access (E-UTRA);Radio Resource Control (RRC);Protocol specification(Release 13)," 3GPP TS 36.331 V13.0.0, 3rd Generation Partnership Project, Valbonne, France (Dec. 2015).
(Continued)

*Primary Examiner* — Ayaz R Sheikh
*Assistant Examiner* — Faiyazkhan Ghafoerkhan
(74) *Attorney, Agent, or Firm* — Leydig, Voit & Mayer, Ltd.

(57) ABSTRACT

Embodiments of the present invention provide a communication resource allocation method and apparatus, a terminal device, a base station, and a communications system. The method includes: sending, by a first network device, a resource request message to a second network device, where the resource request message is used to request a first communication resource, the first communication resource is a resource for sending a relay message to a third network device by the first network device, the resource request message includes first relay service type indication information, and the first relay service type indication information is used to indicate a type of a relay service to be performed by the first network device by using the first communication resource; and receiving, by the first network (Continued)

device, a resource configuration message sent by the second network device.

16 Claims, 12 Drawing Sheets

(51) Int. Cl.
*H04W 40/00* (2009.01)
*H04W 72/04* (2009.01)
*H04W 4/06* (2009.01)
*H04W 28/26* (2009.01)
*H04W 88/04* (2009.01)
*H04W 4/70* (2018.01)

(52) U.S. Cl.
CPC ... *H04W 72/0406* (2013.01); *H04W 72/0486* (2013.01); *H04W 76/14* (2018.02); *H04W 88/04* (2013.01); *H04W 4/70* (2018.02); *H04W 72/0413* (2013.01)

(56) References Cited

U.S. PATENT DOCUMENTS

| | | | |
|---|---|---|---|
| 10,171,958 B2 * | 1/2019 | Wu | H04L 12/189 |
| 2015/0004901 A1 * | 1/2015 | Agiwal | H04W 76/14 455/39 |
| 2015/0029866 A1 * | 1/2015 | Liao | H04W 48/14 370/241 |
| 2015/0201452 A1 * | 7/2015 | Wang | H04W 76/14 455/426.1 |
| 2015/0215028 A1 * | 7/2015 | Ljung | H04W 88/04 370/315 |
| 2015/0271657 A1 | 9/2015 | Xiong et al. | |
| 2016/0150390 A1 * | 5/2016 | Chen | H04W 48/16 370/311 |
| 2016/0330781 A1 * | 11/2016 | Kalhan | H04W 36/36 |
| 2016/0344841 A1 * | 11/2016 | Wang | H04L 67/12 |
| 2017/0006658 A1 * | 1/2017 | Jung | H04W 76/27 |
| 2017/0064534 A1 * | 3/2017 | Loehr | H04W 72/0413 |
| 2017/0094495 A1 * | 3/2017 | Ke | H04W 4/023 |
| 2017/0195911 A1 * | 7/2017 | Lee | H04W 4/08 |
| 2017/0201904 A1 * | 7/2017 | Lee | H04W 4/08 |
| 2018/0077518 A1 * | 3/2018 | Nguyen | G08G 5/0008 |
| 2018/0123682 A1 * | 5/2018 | Jung | H04B 7/2606 |
| 2018/0242381 A1 * | 8/2018 | Wei | H04W 40/22 |
| 2018/0270801 A1 * | 9/2018 | Novlan | H04W 56/0015 |
| 2019/0098554 A1 * | 3/2019 | Ljung | H04W 4/06 |

FOREIGN PATENT DOCUMENTS

| | | |
|---|---|---|
| CN | 105191178 A | 12/2015 |
| EP | 2919524 A1 | 9/2015 |
| EP | 2942993 A1 | 11/2015 |
| JP | 2016531463 A | 10/2016 |
| JP | 2017504247 A | 2/2017 |
| JP | 2017517966 A | 6/2017 |
| KR | 20150002521 A | 1/2015 |
| KR | 20160003257 A | 1/2016 |
| WO | 2014209077 A1 | 12/2014 |
| WO | 2015095580 A1 | 6/2015 |
| WO | 2015124185 A1 | 8/2015 |
| WO | 2015148158 A1 | 10/2015 |
| WO | 2015169464 A1 | 11/2015 |

OTHER PUBLICATIONS

"3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 13)," 3rd Generation Partnership Project, Valbonne, France3GPP TS 36.300 V13.2.0, (Dec. 2015).

Korean Patent Application 10-2018-7025681, Notice of Allowance, dated Dec. 1, 2020.

* cited by examiner

COMMUNICATION RESOURCE ALLOCATION METHOD AND APPARATUS, TERMINAL DEVICE, BASE STATION, AND COMMUNICATIONS SYSTEM

CROSS-REFERENCE TO RELATED APPLICATION

This application is a continuation of International Application No. PCT/CN2016/073663, filed on Feb. 5, 2016, the disclosure of which is hereby incorporated by reference in its entirety.

TECHNICAL FIELD

Embodiments of the present invention relate to the field of communications technologies, and in particular, to a communication resource allocation method and apparatus, a terminal device, a base station, and a communications system.

BACKGROUND

A terminal device-to-terminal device (Device-to-Device, D2D for short) communication technology is a technology in which terminal devices directly communicate with each other. In the technology, data of a terminal device does not need to be transmitted by using a base station, but is directly transmitted by using an air interface between terminal devices. Therefore, the terminal device depends less on a network, and a network forwarding delay is shortened to some extent.

By using the D2D communication technology, a first terminal device may establish a data transmission channel to a base station by using a second terminal device, that is, may use the second terminal device as a relay terminal device to obtain a service provided by the base station. In a process in which the first terminal device performs data transmission with the base station by using the second terminal device, the first terminal device needs to first discover the second terminal device by using a direct discovery process in the D2D communication technology, and then perform communication according to a direct communication process in the D2D communication technology.

In the direct discovery process, the terminal device (including the first terminal and the second terminal device) needs to obtain a direct discovery resource from the base station, and in the direct communication process, the terminal device needs to obtain a direct communication resource from the base station. There may be two manners both for obtaining the direct discovery resource and for obtaining the direct communication resource. In one manner, a corresponding resource is obtained by obtaining a broadcast message of the base station. In the other manner, a corresponding resource request message is sent to the base station, and a corresponding resource is obtained by allocating the corresponding resource to the terminal device by the base station by using dedicated signaling.

When using the second terminal device as the relay terminal device to obtain a service provided by the base station, the first terminal device needs to first search for the second terminal device by using the direct discovery process, so as to perform a direct communication process with the second terminal device. If the terminal device obtains a resource by sending a resource request message to the base station, the base station determines, according to only a load status of the base station, whether to allocate a resource to the terminal device, and does not consider another factor. Consequently, resource scheduling is not flexible or accurate enough. If the terminal device obtains a resource from a resource broadcast by the base station, a conflict with a resource used in another type of direct communication may occur. Consequently, communication quality and efficiency are affected.

SUMMARY

To resolve a prior-art problem that communication quality and efficiency are affected because resource allocation is not accurate enough, embodiments of the present invention provide a resource scheduling method and apparatus. The technical solutions are as follows:

According to a first aspect, an embodiment of the present invention provides a communication resource allocation method, where the method includes: sending, by a first network device, a resource request message to a second network device, where the resource request message is used to request a first communication resource, the first communication resource is a resource for sending a relay message to a third network device by the first network device, the relay message includes at least one of a first message or a second message, the first message is used for proximity service discovery between the first network device and the third network device, the second message is used for proximity service communication between the first network device and the third network device, the resource request message includes first relay service type indication information, and the first relay service type indication information is used to indicate a type of a relay service to be performed by the first network device by using the first communication resource; and receiving, by the first network device, a resource configuration message sent by the second network device, where the resource configuration message includes the first communication resource allocated by the second network device to the first network device according to the resource request message.

For ease of distinguishing, in the following description, the first message is referred to as a direct discovery message, and the second message is referred to as a direct communication message.

In an implementation of this embodiment of the present invention, the sending, by a first network device, a resource request message to a second network device may include:

receiving, by the first network device, a broadcast message sent by a base station, where the broadcast message includes capability information of the base station, and capability information of the second network device includes at least one of indication information indicating whether a relay service is supported, indication information indicating a supported relay service type, or supported frequency information used to send a direct discovery message and/or send a direct communication message; and sending, by the first network device, the resource request message to the base station according to the capability information of the second network device.

When the capability information of the second network device in the broadcast message includes the indication information indicating the relay service type supported by the second network device, the sending, by the first network device, the resource request message to the second network device according to the broadcast message includes:

when the relay service type supported by the second network device includes a unicast relay service and a multicast relay service, sending, by the first network device to the second network device, the resource request message that includes the first relay service type indication information.

When the second network device does not support a relay service, or the relay service type supported by the second network device does not include a relay service type currently requested by the first network device, the first network device does not send a resource request message to the second network device.

When the second network device supports only one relay service type (that is, supports a unicast relay service or a multicast relay service), and a relay service type currently requested by the first network device is the relay service type supported by the second network device, the resource request message sent by the first network device to the second network device may not include the first relay service type indication information, or may include the first relay service type indication information.

It can be learned that when the broadcast message includes the indication information indicating the relay service type supported by the second network device, unnecessary resource request messages sent by the first network device to the second network device may be reduced, so that load of the first network device is reduced, and network resources are saved.

According to a second aspect, an embodiment of the present invention provides a communication resource allocation method, where the method includes:

receiving, by a second network device, a resource request message sent by a first network device, where the resource request message is used to request a first communication resource, the first communication resource is a resource for sending a relay message to a third network device by the first network device, the relay message includes at least one of a first message or a second message, the first message is used for proximity service discovery between the first network device and the third network device, the second message is used for proximity service communication between the first network device and the third network device, the resource request message includes first relay service type indication information, and the first relay service type indication information is used to indicate a type of a relay service to be performed by the first network device by using the first communication resource;

allocating, by the second network device, the first communication resource to the first network device according to the resource request message; and sending, by the second network device, a resource configuration message to the first network device, where the resource configuration message includes the first communication resource.

In the first aspect and the second aspect, after the second network device receives the resource request message that includes the first relay service type indication information, the second network device may determine, according to a load status of the second network device and the relay service type indicated by the first relay service type indication information, whether to allocate a communication resource to a remote terminal device, and does not consider only the load status of the second network device. For example, with relatively high load, the second network device may allocate a resource to a type of relay service (for example, a multicast relay service) in which a relatively small quantity of resources are consumed, and may not allocate a resource to a type of relay service (for example, a unicast relay service) in which a relatively large quantity of resources are consumed. Therefore, resources can be more flexibly allocated, and resource utilization is improved.

In the first aspect and the second aspect, the first communication resource includes at least one of a direct discovery resource or a direct communication resource, the direct discovery resource is used to send a direct discovery message, and the direct communication resource is used to send a direct communication message.

In the first aspect and the second aspect, the first network device may be a remote terminal device or a relay terminal device, the second network device is a base station, and the third network device may be a relay terminal device or a remote terminal device.

When the first network device is a remote terminal device, the third network device is a relay terminal device. In this case, the relay message includes a relay direct discovery solicitation message, a unicast relay connection establishment request message, or a multicast relay service request message.

When the first network device is a relay terminal device, the third network device is a remote terminal device. In this case, the relay message includes a response message of a relay direct discovery solicitation message, a relay usable announcement message, a response message of a unicast relay connection establishment request message, or a response message of a multicast relay service request message.

The first relay service type indication information may use an explicit indication manner, or may use an implicit indication manner.

Specifically, the explicit indication manner indicates that the first relay service type indication information directly indicates the foregoing three cases, that is, the first relay service type indication information may be indication information indicating a unicast relay service, indication information indicating a multicast relay service, or indication information indicating a unicast relay service and a multicast relay service.

The implicit indication manner indicates that the first relay service type indication information implicitly indicates a relay service type by sending, by a terminal device to a base station, information related to the relay service type. The first relay service type indication information using the implicit indication manner may be a type of a communication address included in a resource request message sent by the terminal device to the base station. Specifically, when the resource request message sent by the terminal device to the base station includes a unicast communication address, it indicates that the first relay service type indication information indicates a unicast relay service. When the resource request message sent by the terminal device to the base station includes a multicast communication address, it indicates that the first relay service type indication information indicates a multicast relay service. When the resource request message sent by the terminal device to the base station includes a unicast communication address and a multicast communication address, it indicates that the first relay service type indication information correspondingly indicates a unicast relay service and a multicast relay service. The unicast communication address includes a device identifier of the terminal device, and may be a device identifier of the remote terminal device (ProSe UE ID), or may be a device identifier of the relay terminal device (ProSe Relay UE ID). The multicast communication address includes an identifier of a communication group (Group ID).

The relay service type indicated by the first relay service type indication information may include the following three cases: (1) a unicast relay service; (2) a multicast relay service; or (3) a unicast relay service and a multicast relay service.

Optionally, in the first aspect and the second aspect, the resource configuration message may further include second relay service type indication information, and second service type indication information is used to indicate a type of a relay service in which the first communication resource can be used, so that the first network device can identify a type of a relay service to which the first communication resource in the resource configuration message is applicable.

Optionally, when the first communication resource is a direct communication resource, the resource configuration message further includes data type indication information, the data type indication information is used to indicate a data type that can be borne in the resource, and the data type includes control signaling and user data.

According to a third aspect, an embodiment of the present invention provides a communication resource allocation method, where the method includes:

receiving, by a first network device, a resource configuration message sent by a second network device, where the resource configuration message includes a communication resource and first relay service type indication information, and the first relay service type indication information is used to indicate a type of a relay service in which the communication resource can be used; and obtaining, by the first network device, a first communication resource according to the resource configuration message, where the first communication resource is a resource used to send a relay message to a third network device, the relay message includes at least one of a first message or a second message, the first message is used for proximity service discovery between the first network device and the third network device, and the second message is used for proximity service communication between the first network device and the third network device.

In an implementation of the first aspect, the obtaining, by the first network device, a first communication resource according to the resource configuration message includes:

when the relay service type indicated by the first relay service type indication information in the resource configuration message includes a relay service type currently requested by the first network device, obtaining the first communication resource from the communication resource configured in the resource configuration message; or when the relay service type indicated by the first relay service type indication information in the resource configuration message does not include a relay service type currently requested by the first network device, sending a resource request message to the second network device, where the resource request message is used to request the first communication resource.

According to a fourth aspect, an embodiment of the present invention provides a communication resource allocation method, where the method includes:

generating, by a second network device, a resource configuration message, where the resource configuration message includes a communication resource and first relay service type indication information, and the first relay service type indication information is used to indicate a type of a relay service in which the communication resource can be used; and broadcasting, by the second network device, the resource configuration message.

A type of a direct communication service in which a broadcast communication resource can be used is indicated in a resource configuration message broadcast by a second network device, so that a conflict with a resource used in another type of direct communication can be avoided, and communication quality and efficiency can be improved.

In the third aspect and the fourth aspect, the communication resource includes at least one of a direct discovery resource or a direct communication resource, the direct discovery resource is used to send a direct discovery message, and the direct communication resource is used to send a direct communication message.

Specifically, the direct discovery message includes at least one of the following messages: a relay direct discovery solicitation message, a response message of a relay direct discovery solicitation message, or a relay usable announcement message. The direct communication message includes at least one of the following messages: a unicast relay connection establishment request message, a response message of a unicast relay connection establishment request message, a multicast relay service request message, or a response message of a multicast relay service request message.

Optionally, when the first communication resource is a direct communication resource, the resource configuration message further includes data type indication information, the data type indication information is used to indicate a data type that can be borne in the resource, and the data type includes control signaling and user data.

According to a fifth aspect, an embodiment of the present invention further provides a communication resource allocation method, where the method includes:

receiving, by a first network device, a resource configuration message sent by a second network device, where the resource configuration message includes first frequency information supported by the second network device; and sending, by the first network device, a second resource request message to the second network device when second frequency information carried in a first resource request message sent by the first network device does not match third frequency information, where the second resource request message includes the third frequency information, the third frequency information is frequency information that is configured by the first network device and that is used to send a communication message, the third frequency information is included in the first frequency information, and the first resource request message is sent before the second resource request message is sent; or sending, by the first network device, a third resource request message to the second network device when second frequency information carried in a first resource request message sent by the first network device does not match the first frequency information, where the third resource request message includes fourth frequency information, the fourth frequency information is included in the first frequency information, and the first resource request message is sent before the third resource request message is sent.

It is detected whether second frequency information carried in a first resource request message sent by a first network device matches third frequency information configured by the first network device, that is, it is detected whether a frequency of a resource currently requested by the first network device changes compared with a frequency of a resource requested last time. If the frequency of the resource currently requested by the first network device changes, the first network device sends a second resource request message to a second network device to request a resource on a new frequency. Alternatively, it is detected whether second frequency information carried in a first resource request message sent by a first network device matches first frequency information currently supported by a second network device, that is, it is determined whether the second network device can provide a resource that is on a frequency and that is requested by the first network device last time. If the second network device cannot provide the resource that is on the frequency and that is requested by the first network device last time, the first network device sends a third resource request message to the second network device to request a resource on a new frequency, so as to ensure communication quality of a terminal device.

That the second frequency information carried in the first resource request message sent by the first network device does not match the third frequency information includes at least one of the following cases:

The second frequency information is different from the third frequency information; or a first data structure used when the first network device sends the first resource request message is different from a second data structure used when the first network device sends the second resource request message.

That the second frequency information carried in the first resource request message sent by the first network device does not match the first frequency information includes at least one of the following cases:

The second frequency information is not included in the first frequency information; or partial information of the second frequency information is not included in the first frequency information.

According to a sixth aspect, an embodiment of the present invention further provides a communication resource allocation apparatus, where the apparatus includes a unit configured to implement the method according to the first aspect, for example, a sending unit and a receiving unit.

According to a seventh aspect, an embodiment of the present invention further provides a communication resource allocation apparatus, where the apparatus includes a unit configured to implement the method according to the second aspect, for example, a receiving unit, an allocation unit, and a sending unit.

According to an eighth aspect, an embodiment of the present invention further provides a communication resource allocation apparatus, where the apparatus includes a unit configured to implement the method according to the third aspect, for example, a receiving unit and an obtaining unit.

According to a ninth aspect, an embodiment of the present invention further provides a communication resource allocation apparatus, where the apparatus includes a unit configured to implement the method according to the fourth aspect, for example, a generation unit and a sending unit.

According to a tenth aspect, an embodiment of the present invention further provides a communication resource allocation apparatus, where the apparatus includes a unit configured to implement the method according to the fifth aspect, for example, a receiving unit and a sending unit.

According to an eleventh aspect, an embodiment of the present invention further provides a terminal device, where the terminal device includes a processor and a memory, the memory is configured to store a software program, and when running or executing the software program stored in the memory, the processor may perform the method according to the first aspect, the fourth aspect, or the fifth aspect.

According to a twelfth aspect, an embodiment of the present invention further provides a base station, where the base station includes a processor and a memory, the memory is configured to store a software program, and when running or executing the software program stored in the memory, the processor may perform the method according to the second aspect or the third aspect.

According to a thirteenth aspect, an embodiment of the present invention further provides a computer readable medium, configured to store program code for execution by a base station, where the program code includes an instruction for performing the method according to the first aspect, the fourth aspect, or the fifth aspect.

According to a fourteenth aspect, an embodiment of the present invention further provides a computer readable medium, configured to store program code for execution by a base station, where the program code includes an instruction for performing the method according to the second aspect or the third aspect.

According to a fifteenth aspect, an embodiment of the present invention further provides a communications system, including a first network device, a second network device, and a third network device, where the first network device is configured to send a resource request message to the second network device, where the resource request message is used to request a first communication resource, the first communication resource is a resource for sending a relay message to the third network device by the first network device, the relay message includes at least one of a first message or a second message, the first message is used for proximity service discovery between the first network device and the third network device, the second message is used for proximity service communication between the first network device and the third network device, the resource request message includes first relay service type indication information, and the first relay service type indication information is used to indicate a type of a relay service to be performed by the first network device by using the first communication resource;

the second network device is configured to: receive the resource request message sent by the first network device; allocate the first communication resource to the first network device according to the resource request message; and send a resource configuration message to the first network device, where the resource configuration message includes the first communication resource; and the first network device is further configured to receive the resource configuration message sent by the second network device.

According to a sixteenth aspect, an embodiment of the present invention further provides a communications system, including a first network device, a second network device, and a third network device, where the second network device is configured to: generate a resource configuration message, where the resource configuration message includes a communication resource and first relay service type indication information, and the first relay service type indication information is used to indicate a type of a relay service in which the communication resource can be used; and broadcast the resource configuration message; and the first network device is configured to: receive the resource configuration message sent by the second network device, and obtain a first communication resource according to the resource configuration message, where the first communication resource is a resource used to send a relay message to the third network device, the relay message includes at least one of a first message or a second message, the first message is used for proximity service discovery between the first network device and the third network device, and the second message is used for proximity service communication between the first network device and the third network device.

According to a seventeenth aspect, an embodiment of the present invention further provides a communications system, including a first network device and a second network device, where the second network device is configured to broadcast a resource configuration message, where the resource configuration message includes first frequency information supported by the second network device; and the first network device is configured to: receive the resource configuration message sent by the second network device; and send, by the first network device, a second resource request message to the second network device when second frequency information carried in a first resource request message sent by the first network device last time does not match third frequency information, and the third frequency information is included in the first frequency information, where the second resource request message includes the third frequency information, and the third frequency information is frequency information that is configured by the first network device and that is used to send a communication message; or send, by the first network device, a third resource request message to the second network device when second frequency information carried in a first resource request message sent by the first network device last time does not match the first frequency information, where the third resource request message includes fourth frequency information, and the fourth frequency information is included in the first frequency information.

DESCRIPTION OF EMBODIMENTS

To make the objectives, technical solutions, and advantages of the present invention clearer, the following further describes the embodiments of the present invention in detail with reference to the accompanying drawings.

To facilitate understanding of the embodiments of the present invention, a cellular communication technology and a D2D communication technology are first briefly described.

Figure 1A:
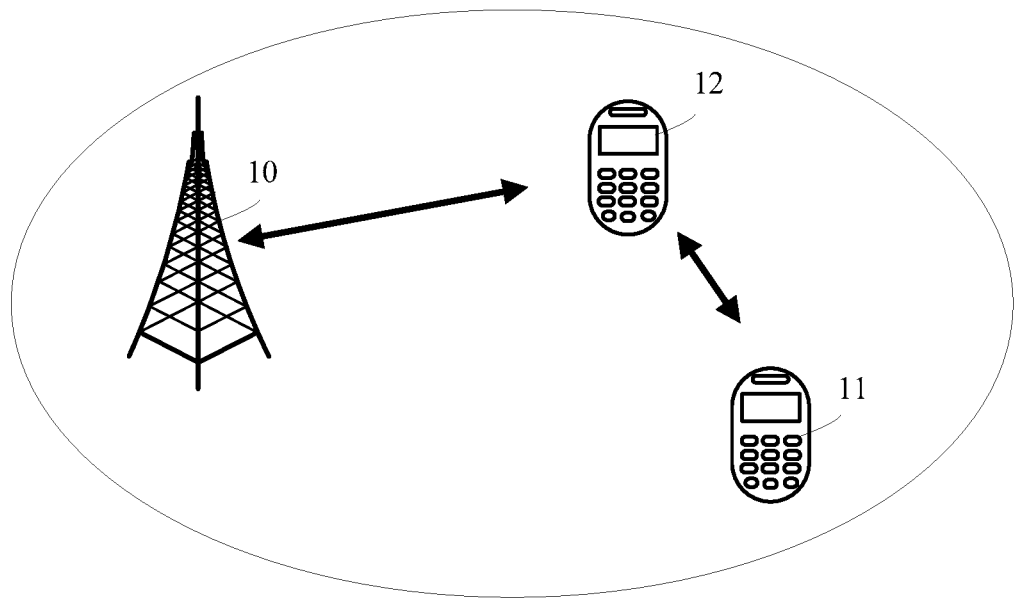
FIG. 1a is a schematic diagram of an application scenario in which relay communication is performed by using a D2D communication technology according to an embodiment of the present invention.

In the cellular communication technology, a terminal device communicates, by using an air interface, with a base station that provides a network service for the terminal device, and forwards user data to a destination node in a network by using the base station. As shown in FIG. 1a, when a terminal device 11 is in an edge area of a coverage area of a base station 10, signal quality of the terminal device 11 possibly cannot meet a communication requirement, or the terminal device 11 may be even disconnected from a network and obtain no network service. In this case, a terminal device 12 with relatively good signal quality within the coverage area may be used as a relay terminal device to continue to provide a network service for the terminal device 11 on the edge of the coverage area, so as to improve communication quality of the terminal device 11 in the edge area of the coverage area. Alternatively, as shown in FIG. 1b, when a terminal device 11 is outside a coverage area of a base station 10, and requires a network service provided by the base station 10, a terminal device 12 within the coverage area of the base station 10 may be used as a relay terminal device to provide a network service for the terminal device 11 outside the coverage area of the base station 10, so that the terminal device 11 outside the coverage area of the base station 10 can receive the network service provided by the base station 10.

Figure 1B:
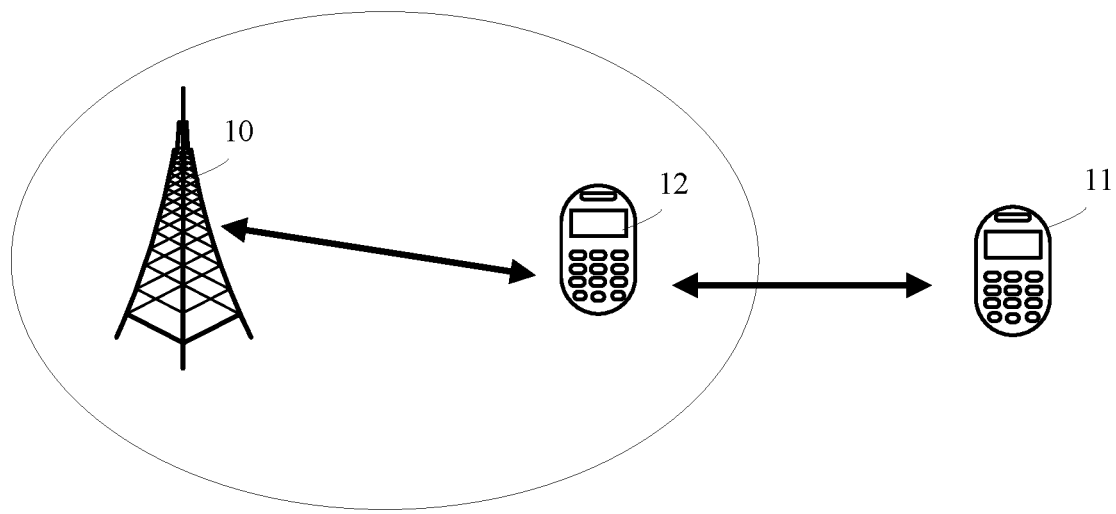
FIG. 1b is a schematic diagram of another application scenario in which relay communication is performed by using a D2D communication technology according to an embodiment of the present invention.

In the embodiments of the present invention, a terminal that obtains, by using a relay terminal device, a network service provided by a base station is referred to as a remote terminal device, such as the terminal device 11 on the edge of the coverage area shown in FIG. 1a and the terminal device 11 outside the coverage area shown in FIG. 1b. A terminal device that provides relay services for a remote terminal device and a base station is referred to as a relay terminal device, such as the terminal device 12 in the middle of the coverage area of the base station in FIG. 1a and FIG. 1b. Providing a relay service means receiving data to be sent by the remote terminal device to the base station and forwarding the data to the base station, and receiving data to be sent by the base station to the remote terminal device and forwarding the data to the remote terminal device, so as to provide a network service for the remote terminal device. Names of the remote terminal device and the relay terminal device are only for the purpose of distinguishing, and do not constitute a limitation on the embodiments of the present invention. In the embodiments of the present invention, the terminal device may also be referred to as user equipment (User Equipment, UE for short), the remote terminal device may also be referred to as remote user equipment (Remote UE), and the relay terminal device may also be referred to as relay user equipment (Relay UE).

In scenarios shown in FIG. 1a and FIG. 1b, the base station 10 and the relay terminal device 12 communicate with each other by using the cellular communication technology. The cellular communication technology includes but is not limited to a Long Term Evolution (LTE)-UMTS system, a Global System for Mobile Communications (GSM), a Code Division Multiple Access (CDMA) system, a Wideband Code Division Multiple Access (WCDMA) system, a General Packet Radio Service (GPRS), a Universal Mobile Telecommunication System (UMTS), a Worldwide Interoperability for Microwave Access (WiMAX) communications system, and the like.

In the scenarios shown in FIG. 1a and FIG. 1b, the relay terminal device 12 and the remote terminal device 11 communicate with each other by using the D2D communication technology. The D2D communication technology is a technology in which terminal devices directly communicate with each other. In the technology, data of a terminal device does not need to be transmitted by using a base station, but is directly transmitted by using an air interface between terminal devices. The D2D communication technology includes direct discovery (which is also referred to as sidelink discovery, or proximity service discovery (ProSe discovery), or proximity service direct discovery (ProSe Direct discovery)), and direct communication (Sidelink communication, or proximity service communication (ProSe communication), or proximity service direct communication (ProSe Direct communication)).

Direct discovery in the D2D communication technology includes two modes: a first mode and a second mode. A direct discovery process in the first mode is as follows: A first terminal device sends a direct discovery message to a second terminal device in proximity of the first terminal device by using a direct discovery resource allocated or pre-allocated by a base station; after receiving the direct discovery message, the second terminal device sends a response message of the direct discovery message to the first terminal device by using a direct discovery resource allocated or pre-allocated by the base station; and when the first terminal device receives the response message of the direct discovery message, the first terminal device discovers the second terminal device. A direct discovery process in the second mode is as follows: A second terminal device sends a direct discovery announcement message to the second terminal device in proximity of the second terminal device by using a direct discovery resource allocated or pre-allocated by a base station; and when a first terminal device receives the direct discovery announcement message, the first terminal device discovers the second terminal device.

Figure 1C:
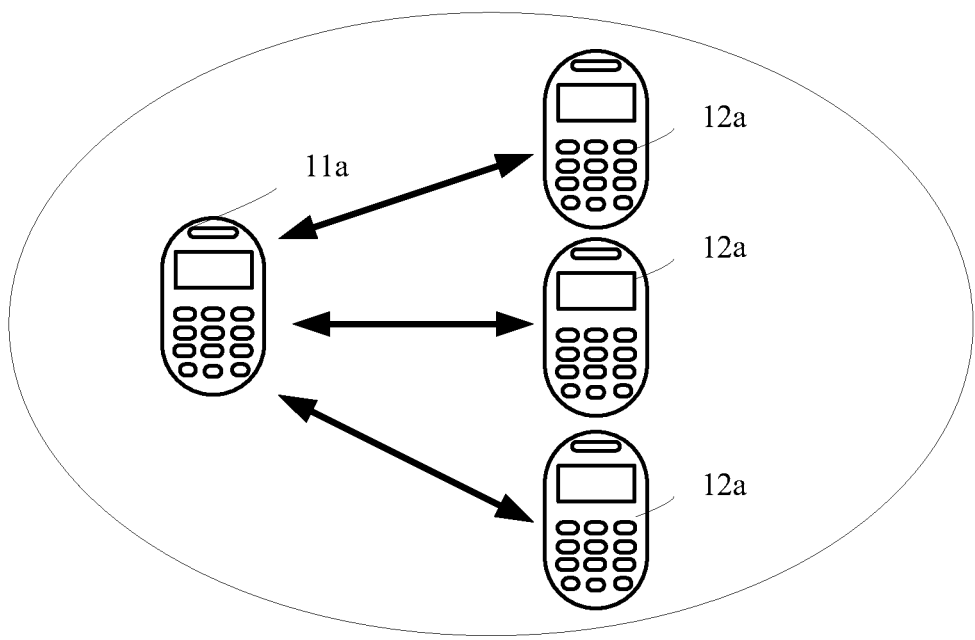
FIG. 1c is a schematic diagram of a unicast communication scenario in a D2D communication technology.
Figure 1D:
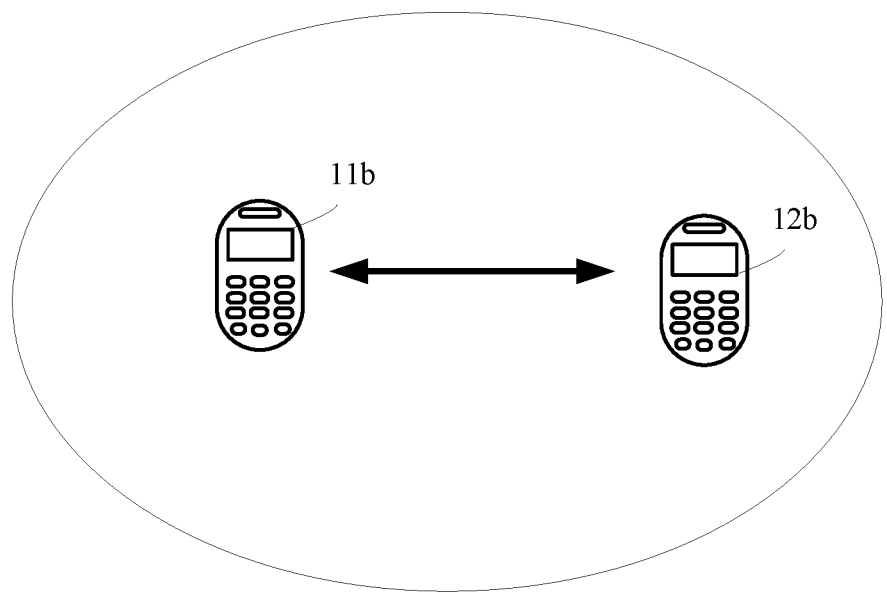
FIG. 1d is a schematic diagram of a multicast communication scenario in a D2D communication technology.

There are two types of direct communication in the D2D communication technology, that is, one-to-one direct communication (one-to-one communication, which is also referred to as unicast communication), and one-to-many direct communication (one-to-many communication, which is also referred to as multicast communication, group cast communication or group communication). One-to-one direct communication means that one terminal device 11b may send data to another terminal device 12b, as shown in FIG. 1d. One-to-many direct communication means that one terminal device 11a may send data to multiple terminal devices 12a in a communication group, as shown in FIG. 1c. In a direct communication process, the first terminal device and the second terminal device communicate with each other by using a direct communication resource allocated or pre-allocated by the base station.

In the scenarios shown in FIG. 1a and FIG. 1b, the relay terminal device and the remote terminal device communicate with each other in a relay direct communication manner in the D2D communication technology, that is, the remote terminal device establishes a data transmission channel to the base station by using the relay terminal device. Corresponding to a common type of direct communication, relay direct communication also includes two types of services: a unicast relay service (that is, a one-to-one Relaying service) and a multicast relay service (that is, a group Replaying service, which is also referred to as a one-to-many Relaying service). The multicast relay service may include but is not limited to a multimedia broadcast/multicast service (MBMS) relaying service, an evolved multimedia broadcast/multicast service (Enhanced Multimedia Broadcast/Multicast Service, eMBMS for short) relaying service, and a Single Cell Point to Multipoint transmission service (SC-PTM) relaying service.

When obtaining, by using the relay terminal device, a service provided by the base station, the remote terminal device needs to first search for the relay terminal device by using the direct discovery process, so as to perform a direct communication process with the relay terminal device. In the direct communication process, different time-frequency resources of the base station are consumed in different types of direct communication. For example, for a multicast relay service, the remote terminal device does not need to consume an excessive quantity of resources. However, for a unicast communication service, the remote terminal device requires the base station to continuously allocate resources, consuming a large quantity of resources. If the terminal device obtains a resource by sending a resource request message to the base station, considering that the terminal device does not indicate a type of direct communication to be performed by the terminal device in the prior art, the base station determines, according to only a load status of the base station, whether to allocate a resource to the terminal device, does not consider the type of direct communication, and may reject requests of all remote terminal devices. Consequently, resource scheduling is not flexible and accurate enough, and communication efficiency is affected. In addition, considering service characteristics of different types of direct communication, for example, emergency, if the terminal device obtains a resource from a resource broadcast by the base station, a conflict with a resource used in another type of direct communication may occur. Consequently, communication quality and efficiency are affected.

Therefore, the present invention provides a resource allocation method. When a resource is allocated to a terminal device according to a request of the terminal device, a type of direct communication to be performed by the terminal device is also considered, so that flexibility and accuracy of resource scheduling are improved. The embodiments of the present invention further provide a resource allocation method. A type of a direct communication service in which a broadcast communication resource can be used is indicated in a resource configuration message broadcast by a base station, so that a conflict with a resource used in another type of direct communication can be avoided, and communication quality and efficiency can be improved.

In scenarios shown in FIG. 1a to FIG. 1d, the terminal device includes but is not limited to a mobile phone, an intelligent terminal, a multimedia device, a streaming media device, and the like. The base station may be an evolved NodeB (eNB) in an LTE system. The eNB is a bridge between UE and an evolved packet core (EPC) in the LTE system, and eNBs are connected to each other by using an X2 interface. Main functions of the eNB include radio resource management, Internet Protocol (IP) header compression and user data stream encryption, mobility management entity (MME) selection during attachment of the UE, routing of user plane data to a serving gateway (S-GW), paging message organization and sending, broadcast message organization and sending, measurement for the purpose of mobility or scheduling and measurement report configuration, and the like. Certainly, the base station may be an access network entity in another communications system.

Figure 2:
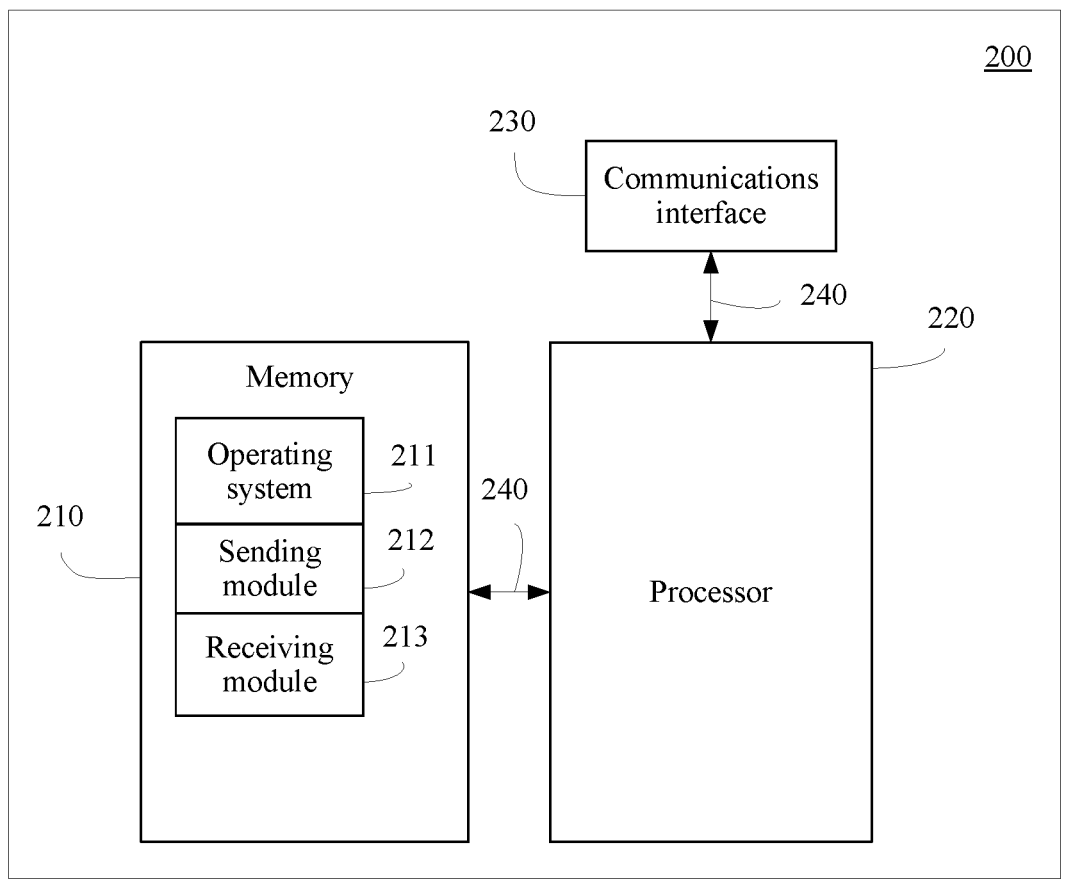
FIG. 2 is a schematic structural diagram of a terminal device according to an embodiment of the present invention.

The terminal device in FIG. 1a and FIG. 1b may use a structure shown in FIG. 2. As shown in FIG. 2, a terminal device 200 includes a memory 210, a processor 220, a communications interface 230, and a communications bus 240. The communications bus 240 is configured to implement connection and communication between the memory 210, the processor 220, and the communications interface 230. The structure of the terminal device 200 shown in FIG. 3 does not constitute a limitation on the terminal device, and may include more or fewer components than those shown in the figure, or combine some components, or have different component arrangements.

The communications interface 230 may be configured to implement communication and connection between the terminal 200 and at least one another network element by using a cellular communications network, an Internet, a wide area network, a local area network, a metropolitan area network, or the like.

The processor 220 is a control center of the terminal device 200, uses various interfaces and lines to connect various parts of the entire base station, and by running or executing a software program stored in the memory 210 and by invoking data stored in the memory 210, performs various functions of the terminal 200 and data processing, so as to perform overall control on the base station. Optionally, the processor 220 may include one or more processing cores.

The memory 210 may be configured to: store various types of data such as various configuration parameters, and store a software program. By running the software program stored in the memory 210, the processor 220 executes various function applications and data processing. The memory 210 may mainly include a program storage area and a data storage area. The program storage area may store an operating system 211, a sending module 212, a receiving module 213, and the like, and the data storage area may store data created according to use of the terminal 200. In addition, the memory 210 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Correspondingly, the memory 210 may further include a memory controller, so as to provide the processor 220 with access to the memory 210.

Figure 4:
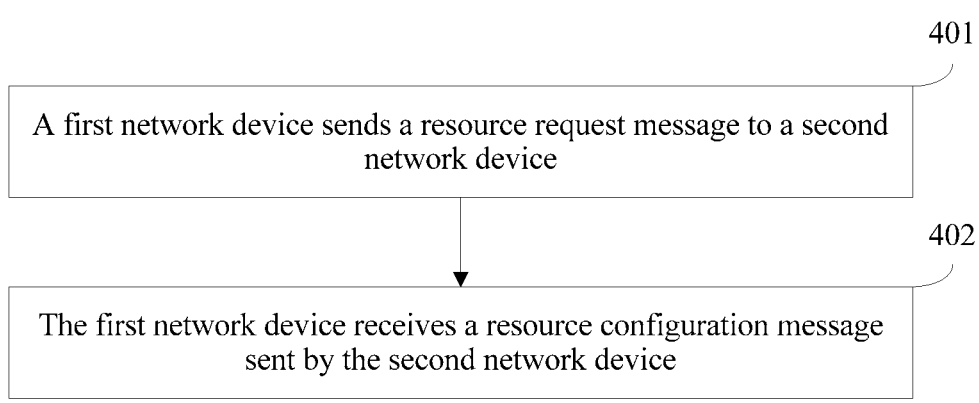
FIG. 4 is a flowchart of a communication resource allocation method according to an embodiment of the present invention.
Figure 5:
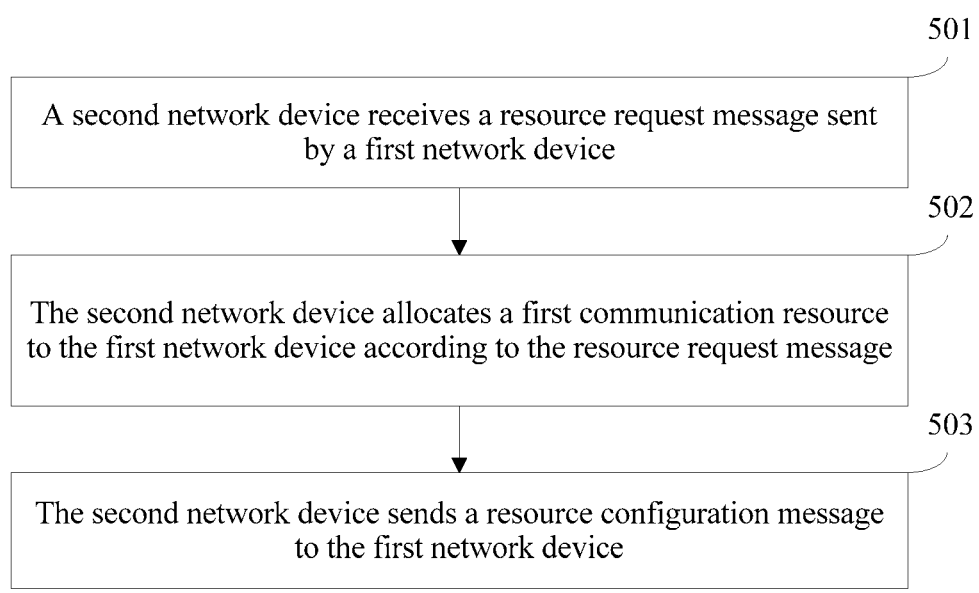
FIG. 5 is a flowchart of another communication resource allocation method according to an embodiment of the present invention.
Figure 6:
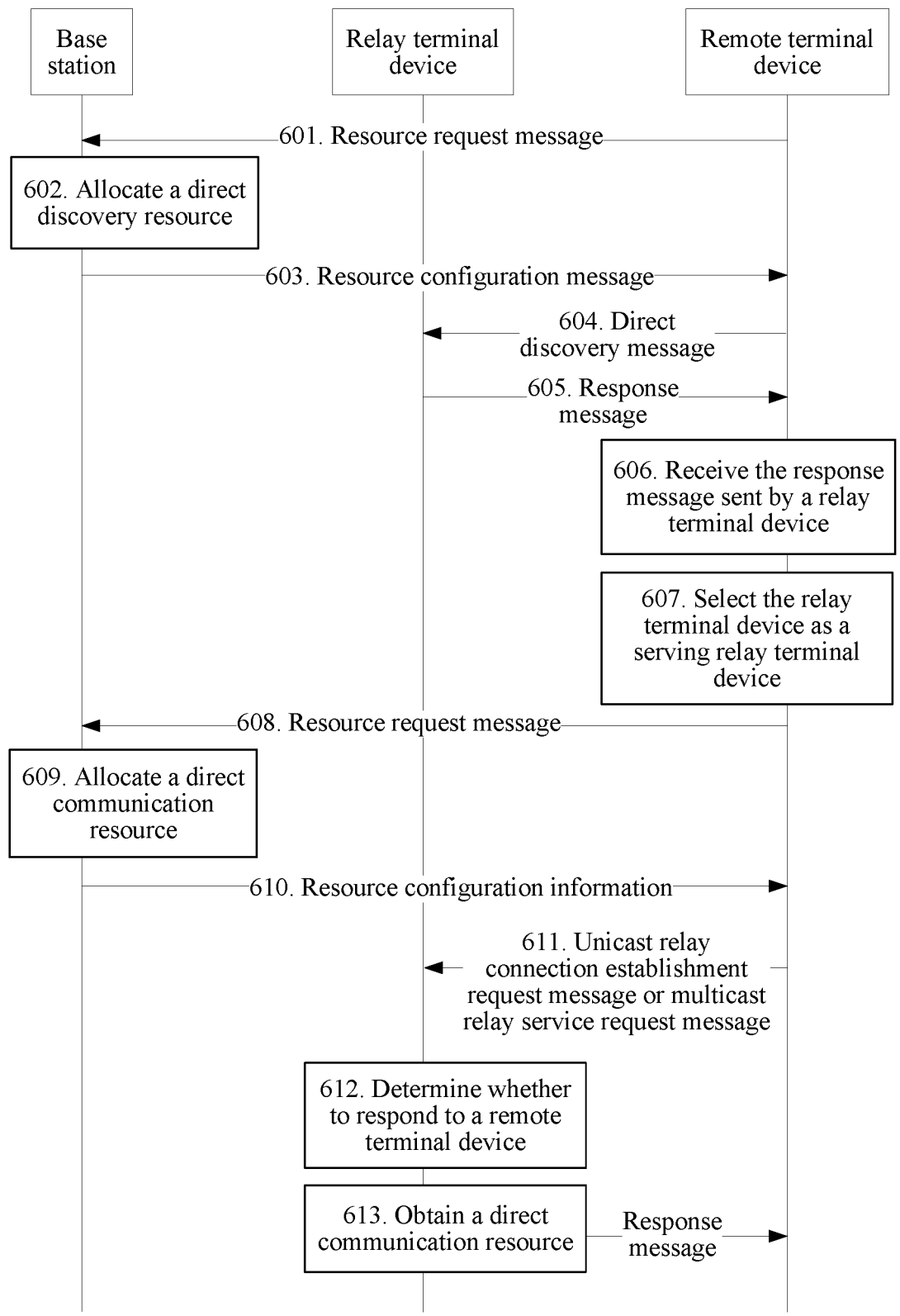
FIG. 6 is a schematic interaction diagram of a relay communication method according to an embodiment of the present invention.

When the terminal device 200 is a first network device in embodiments shown in FIG. 4 to FIG. 6, by running or executing the sending module 212 in the memory 210, the processor 220 may send a resource request message to a second network device by using the communications interface 230. The resource request message is used to request a first communication resource. The first communication resource is a resource for sending a relay message to a third network device by the first network device. The relay message includes at least one of a first message or a second message. The first message is used for proximity service discovery between the first network device and the third network device. The second message is used for proximity service communication between the first network device and the third network device. The resource request message includes first relay service type indication information. The first relay service type indication information is used to indicate a type of a relay service to be performed by the first network device by using the first communication resource. By running or executing the receiving module 213 in the memory 210, the processor 220 may receive, by using the communications interface 230, a resource configuration message sent by the second network device. The resource configuration message includes the first communication resource allocated by the second network device to the first network device according to the resource request message.

Figure 7:
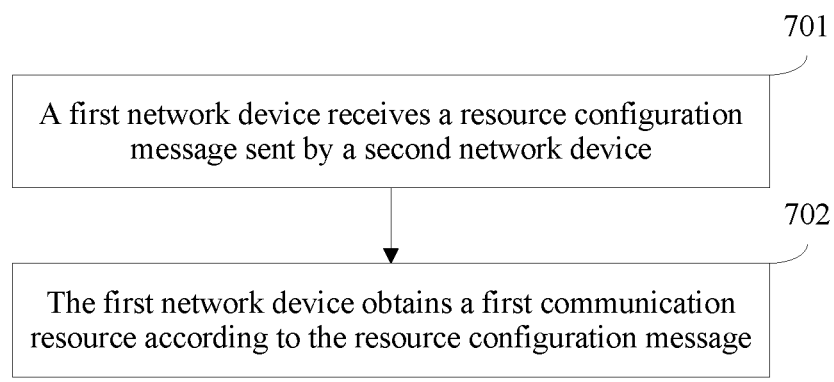
FIG. 7 is a flowchart of still another communication resource allocation method according to an embodiment of the present invention.
Figure 8:
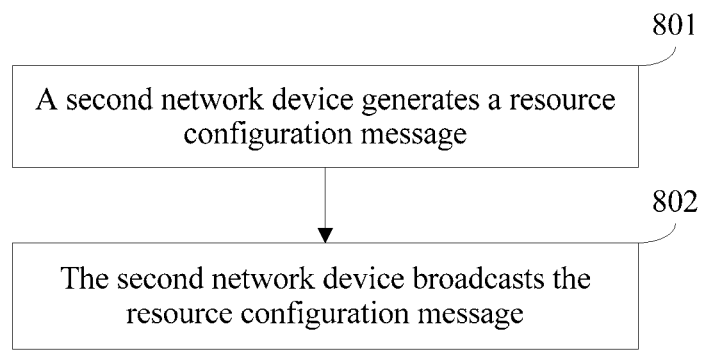
FIG. 8 is a flowchart of still another communication resource allocation method according to an embodiment of the present invention.
Figure 9:
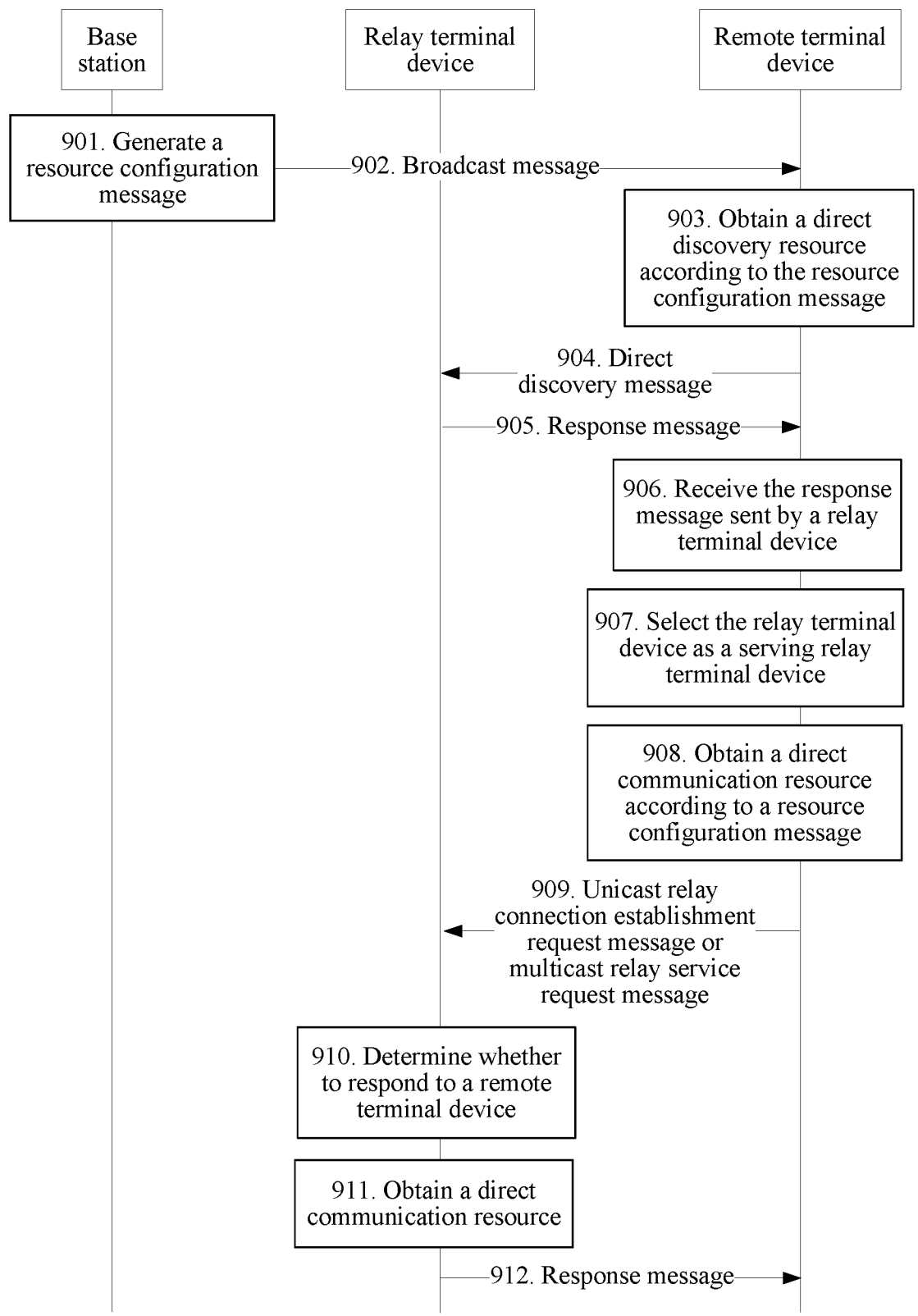
FIG. 9 is a schematic interaction diagram of another relay communication method according to an embodiment of the present invention.

When the terminal device 200 is a first network device in embodiments shown in FIG. 7 to FIG. 9, by running or executing a receiving module (which is not shown in the figure) in the memory 210, the processor 220 may receive, by using the communications interface 230, a resource configuration message sent by a second network device. The resource configuration message includes a communication resource and first relay service type indication information. The first relay service type indication information is used to indicate a type of a relay service in which the communication resource can be used. By running or executing an obtaining module (which is not shown in the figure) in the memory 210, the processor 220 may obtain a first communication resource according to the resource configuration message. The first communication resource is a resource used to send a relay message to a third network device. The relay message includes at least one of a first message or a second message. The first message is used for proximity service discovery between the first network device and the third network device. The second message is used for proximity service communication between the first network device and the third network device.

Figure 10:
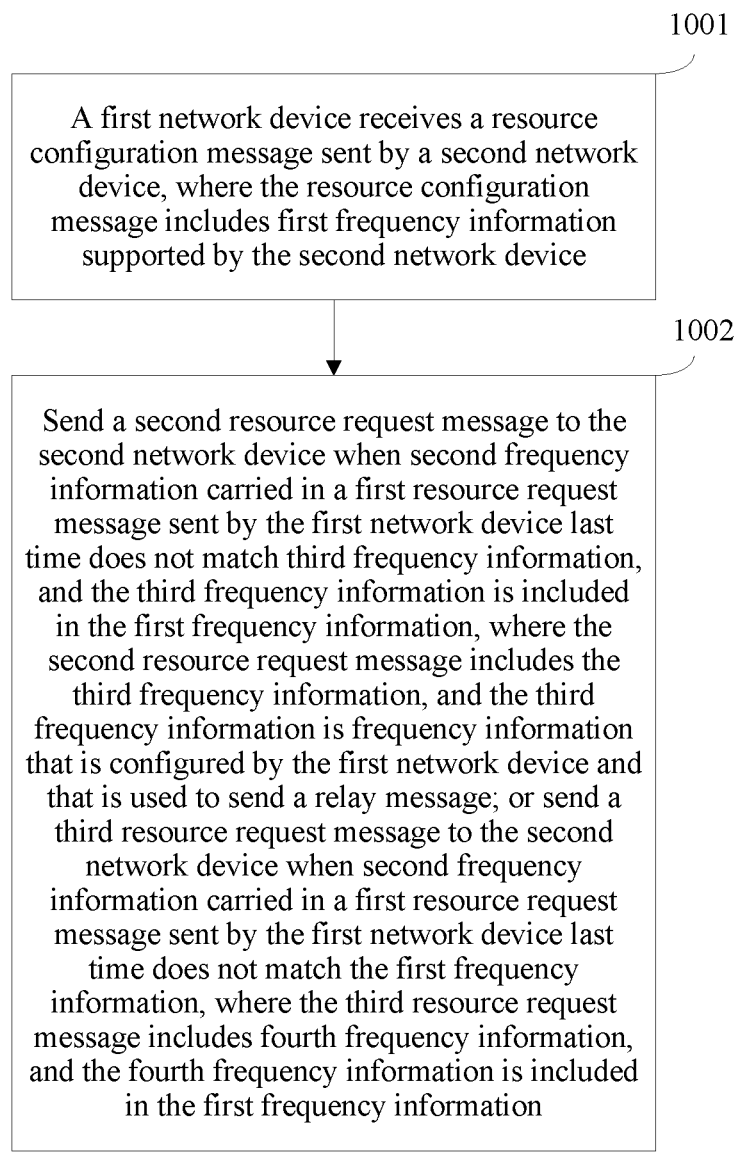
FIG. 10 is a flowchart of another communication resource allocation method according to an embodiment of the present invention.
Figure 11:
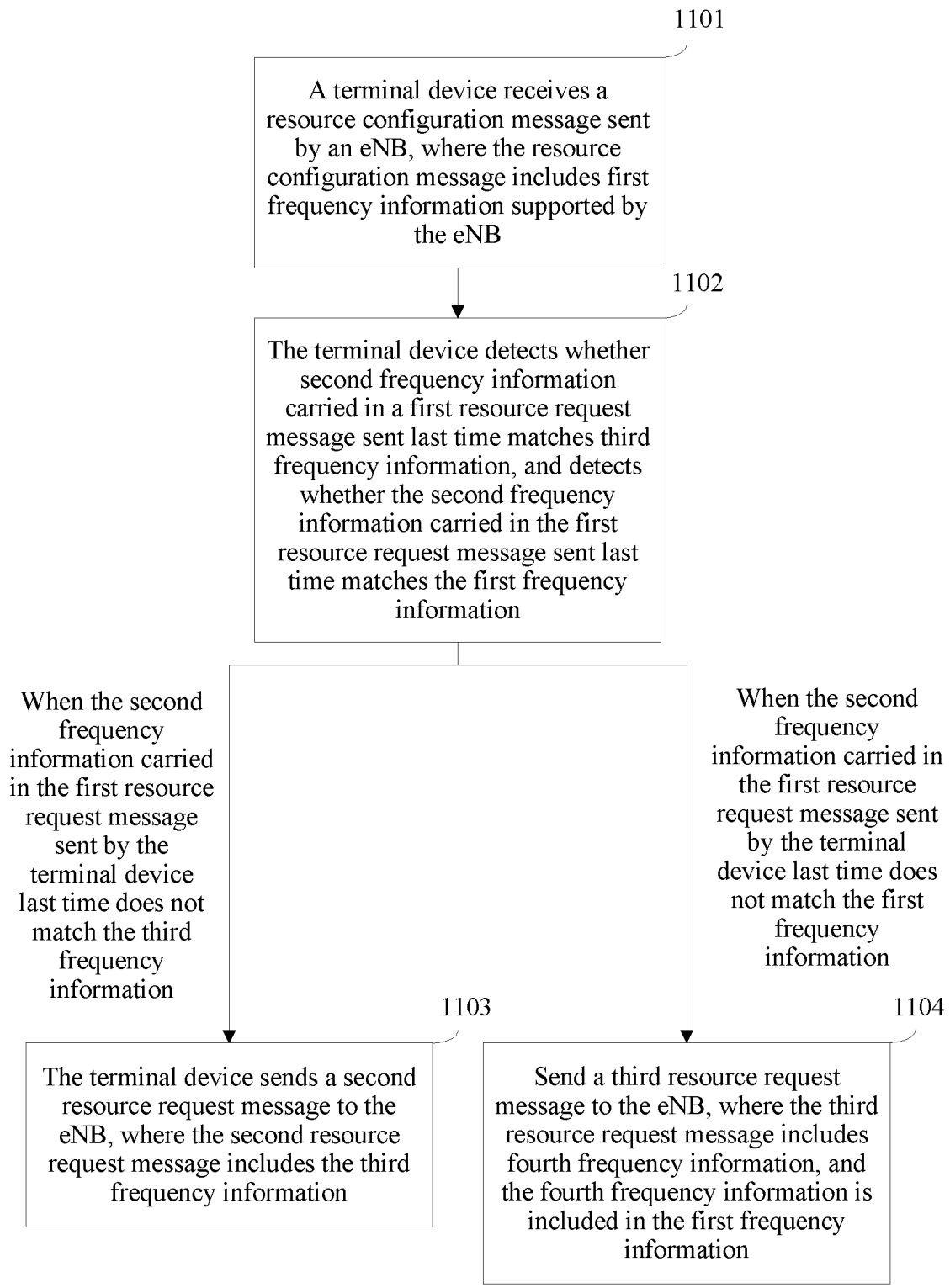
FIG. 11 is a flowchart of another communication resource allocation method according to an embodiment of the present invention.

When the terminal device 200 is a first network device in embodiments shown in FIG. 10 and FIG. 11, by running or executing a receiving module (which is not shown in the figure) in the memory 210, the processor 220 may receive, by using the communications interface 230, a resource configuration message sent by a second network device. The resource configuration message includes first frequency information supported by the second network device. By running or executing a sending module (which is not shown in the figure) in the memory 210, the processor 220 may send, by using the communications interface 230, a second resource request message to the second network device when second frequency information carried in a first resource request message sent by the first network device last time does not match third frequency information. The second resource request message includes the third frequency information. The third frequency information is frequency information that is configured by the first network device and that is used to send a communication message, and the third frequency information is included in the first frequency information. Alternatively, by running or executing a sending module (which is not shown in the figure) in the memory 210, the processor 220 may send, by using the communications interface 230, a third resource request message to the second network device when second frequency information carried in a first resource request message sent by the first network device last time does not match the first frequency information. The third resource request message includes fourth frequency information. The fourth frequency information is included in the first frequency information.

Figure 3:
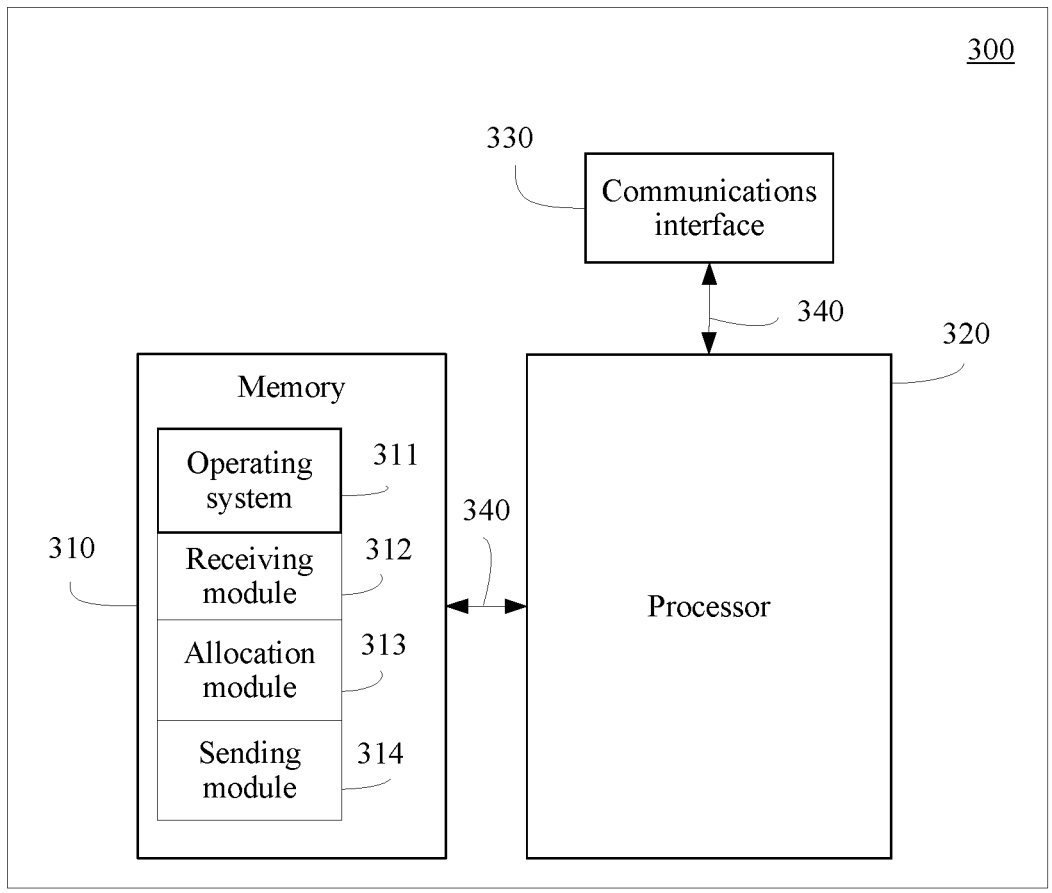
FIG. 3 is a schematic structural diagram of a base station according to an embodiment of the present invention.

The base station in FIG. 1c and FIG. 1d may use a structure shown in FIG. 3. As shown in FIG. 3, a base station 300 includes a memory 310, a processor 320, a communications interface 330, and a communications bus 340. The communications bus 340 is configured to implement connection and communication between the memory 310, the processor 320, and the communications interface 330. The structure of the base station 300 shown in FIG. 3 does not constitute a limitation on the base station, and may include more or fewer components than those shown in the figure, or combine some components, or have different component arrangements.

The communications interface 330 may be configured to implement communication and connection between the base station 300 and at least one another network element by using a cellular communications network, an Internet, a wide area network, a local area network, a metropolitan area network, or the like.

The processor 320 is a control center of the base station 300, uses various interfaces and lines to connect various parts of the entire base station, and by running or executing a software program stored in the memory 310 and by invoking data stored in the memory 310, performs various functions of the base station 300 and data processing, so as to perform overall control on the base station. Optionally, the processor 320 may include one or more processing cores.

The memory 310 may be configured to: store various types of data such as various configuration parameters, and store a software program. By running the software program stored in the memory 310, the processor 320 executes various function applications and data processing. The memory 310 may mainly include a program storage area and a data storage area. The program storage area may store an operating system 311, a receiving module 312, an allocation module 313, a sending module 314, and the like, and the data storage area may store data created according to use of the base station 300, for example, frequency channel number information. In addition, the memory 310 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Correspondingly, the memory 310 may further include a memory controller, so as to provide the processor 320 with access to the memory 310.

When the base station 300 is a second network device in embodiments shown in FIG. 4 to FIG. 6, by running or executing the receiving module 312 in the memory 310, the processor 320 may receive, by using the communications interface 230, a resource request message sent by a first network device. The resource request message is used to request a first communication resource. The first communication resource is a resource for sending a relay message to a third network device by the first network device. The relay message includes at least one of a first message or a second message. The first message is used for proximity service discovery between the first network device and the third network device. The second message is used for proximity service communication between the first network device and the third network device. The resource request message includes first relay service type indication information. The first relay service type indication information is used to indicate a type of a relay service to be performed by the first network device by using the first communication resource. By running or executing the allocation module 313 in the memory 310, the processor 320 may allocate the first communication resource to the first network device according to the resource request message. By running or executing the allocation module 314 in the memory 310, the processor 320 may send a resource configuration message to the first network device by using the communications interface 330. The resource configuration message includes the first communication resource.

When the base station 300 is a second network device in embodiments shown in FIG. 7 to FIG. 9, by running or executing a generation module (which is not shown in the figure) in the memory 310, the processor 320 may generate a resource configuration message. The resource configuration message includes a communication resource and first relay service type indication information. The first relay service type indication information is used to indicate a type of a relay service in which the communication resource can be used. By running or executing a sending module (which is not shown in the figure) in the memory 310, the processor 320 may broadcast the resource configuration message by using the communications interface 330.

FIG. 4 shows a flowchart of a communication resource allocation method according to an embodiment of the present invention. Referring to FIG. 4, the method includes the following steps.

Step 401: A first network device sends a resource request message to a second network device.

The resource request message is used to request a first communication resource. The first communication resource is a resource for sending a relay message to a third network device by the first network device. The relay message includes at least one of a first message or a second message. The first message is used for proximity service discovery between the first network device and the third network device. The second message is used for proximity service communication between the first network device and the third network device. For ease of description, in the following description, the first message is referred to as a direct discovery message, and the second message is referred to as a direct communication message.

The resource request message includes first relay service type indication information. The first relay service type indication information is used to indicate a type of a relay service to be performed by the first network device by using the first communication resource.

The relay service type indicated by the first relay service type indication information may include the following three cases: (1) a unicast relay service; (2) a multicast relay service; or (3) a unicast relay service and a multicast relay service.

Step 402: The first network device receives a resource configuration message sent by the second network device.

The resource configuration message includes the first communication resource allocated by the second network device to the first network device according to the resource request message.

Optionally, the resource configuration message may further include second relay service type indication information. The second service type indication information is used to indicate a type of a relay service in which the first communication resource can be used.

A resource request message sent by a first network device to a second network device carries first relay service type indication information, so that the second network device can determine a type of a relay service to be performed by the first network device by using a first communication resource, and can further determine, according to the type of the relay service to be performed by the first network device by using the first communication resource, whether to allocate a resource to the first network device. Therefore, resources can be more flexibly allocated, and resource utilization is improved.

FIG. 5 shows a flowchart of a communication resource allocation method according to an embodiment of the present invention. Referring to FIG. 5, the method includes the following steps.

Step 501: A second network device receives a resource request message sent by a first network device.

The resource request message is used to request a first communication resource. The first communication resource is a resource for sending a relay message to a third network device by the first network device. The relay message includes at least one of a direct discovery message or a direct communication message. The resource request message includes first relay service type indication information. The first relay service type indication information is used to indicate a type of a relay service to be performed by the first network device by using the first communication resource.

Step 502: The second network device allocates a first communication resource to the first network device according to the resource request message.

Step 503: The second network device sends a resource configuration message to the first network device, where the resource configuration message includes the first communication resource.

A resource request message sent by a first network device to a second network device carries first relay service type indication information, so that the second network device can determine a type of a relay service to be performed by the first network device by using a first communication resource, and can further determine, according to the type of the relay service to be performed by the first network device by using the first communication resource, whether to allocate a resource to the first network device. Therefore, resources can be more flexibly allocated, and resource utilization is improved.

In the embodiments shown in FIG. 4 and FIG. 5, the second network device may be a base station. When the first network device is a remote terminal device, the third network device may be a relay terminal device. When the first network device is a relay terminal device, the third network device may be a remote terminal device. The remote terminal device may be the remote terminal device shown in FIG. 1a, and the relay terminal device may be the relay terminal device shown in FIG. 1a and FIG. 1b.

FIG. 6 shows a schematic interaction diagram of a relay communication method according to an embodiment of the present invention. In the relay communication method, a communication resource allocation method provided in an embodiment of the present invention is used. Referring to FIG. 6, the relay communication method includes the following steps.

Step 601: A remote terminal device sends a resource request message to a base station, where the resource request message is used to request a direct discovery resource.

The direct discovery resource is used by the remote terminal device to send a relay direct discovery solicitation message to a relay terminal device, for example, a discovery solicitation message (Solicitation message). During implementation, the resource request message may be a message that includes sidelink UE information (SidelinkUEInformation).

The resource request message includes first relay service type indication information. The first relay service type indication information is used to indicate a type of a relay service to be performed by the remote terminal by using the requested direct discovery resource.

The relay service type indicated by the first relay service type indication information may include three cases: (1) a unicast relay service; (2) a multicast relay service; or (3) a unicast relay service and a multicast relay service.

Optionally, the first relay service type indication information may use an explicit indication manner, or may use an implicit indication manner.

Specifically, the explicit indication manner indicates that the first relay service type indication information directly indicates the foregoing three cases, that is, the first relay service type indication information may be indication information indicating a unicast relay service, indication information indicating a multicast relay service, or indication information indicating a unicast relay service and a multicast relay service.

The implicit indication manner indicates that the first relay service type indication information implicitly indicates a relay service type by sending, by a terminal device to a base station, information related to the relay service type. The first relay service type indication information using the implicit indication manner may be a type of a communication address included in a resource request message sent by the terminal device to the base station. Specifically, when the resource request message sent by the terminal device to the base station includes a unicast communication address, it indicates that the first relay service type indication information indicates a unicast relay service. When the resource request message sent by the terminal device to the base station includes a multicast communication address, it indicates that the first relay service type indication information indicates a multicast relay service. When the resource request message sent by the terminal device to the base station includes a unicast communication address and a multicast communication address, it indicates that the first relay service type indication information correspondingly indicates a unicast relay service and a multicast relay service. The unicast communication address includes a device identifier of the terminal device, and may be a device identifier of the remote terminal device (ProSe UE ID), or may be a device identifier of the relay terminal device (ProSe Relay UE ID). The multicast communication address includes an identifier of a communication group (Group ID).

During implementation, the remote terminal device may measure, in real time, signal quality of a signal sent by the base station. When the signal quality is lower than a specified value, it is determined that the relay terminal device needs to be used to provide a network service, and a relay terminal device discovery procedure is entered. In the relay terminal device discovery procedure, a status of the remote terminal device is first determined. When the remote terminal device is in a connected (RRC CONNECTED) mode (that is, is connected to the base station), or when the remote terminal device is in an idle (RRC_IDLE) mode (that is, is not connected to the base station) and the base station does not broadcast a resource used to send a direct discovery message, step 601 is performed. The signal quality may be represented by using reference signal received power (RSRP) that is measured by the remote terminal device and that is sent by the base station, or reference signal received quality (RSRQ) that is measured by the remote terminal device and that is sent by the base station.

In an implementation of this embodiment, step 601 includes:

receiving, by the remote terminal device, a broadcast message sent by the base station, where the broadcast message includes capability information of the base station; and sending, by the remote terminal device, the resource request message to the base station according to the broadcast message.

The capability information of the base station includes but is not limited to indication information indicating whether the base station supports a relay service, indication information indicating a relay service type supported by the base station, and frequency information that is supported by the base station and is used to send a direct discovery message and/or send a direct communication message. The broadcast message may include one or more types of the capability information of the base station.

When the capability information of the base station in the broadcast message includes the indication information indicating the relay service type supported by the base station, the sending, by the remote terminal device, the resource request message to the base station according to the broadcast message includes:

when the relay service type supported by the base station includes a unicast relay service and a multicast relay service, sending, by the remote terminal device to the base station, the resource request message that includes the first relay service type indication information.

When the base station does not support a relay service, or the relay service type supported by the base station does not include a relay service type currently requested by the remote terminal device, the remote terminal device does not send a resource request message to the base station.

When the base station supports only one relay service type (that is, supports a unicast relay service or a multicast relay service) and a relay service type currently requested by the remote terminal device is the relay service type supported by the base station, the resource request message sent by the remote terminal device to the base station may not include the first relay service type indication information, or may include the first relay service type indication information.

It can be learned that when the broadcast message includes the indication information indicating the relay service type supported by the base station, unnecessary resource request messages sent by the remote terminal device to the base station may be reduced, so that load of the remote terminal device is reduced, and network resources are saved.

It should be noted that the broadcast message may not include the indication information indicating the relay service type supported by the base station. In this case, the remote terminal device may directly send a resource request message to the base station, and the base station determines whether to allocate, to the remote terminal device, the resource for sending a direct discovery message.

Step 602: The base station receives the resource request message sent by the remote terminal device, and allocates the direct discovery resource to the remote terminal device according to first relay service type indication information in the received resource request message.

As is described above, a capability of the base station may include the following four cases:

(1) The base station does not support a relay service;

(2) the base station supports only a unicast relay service;

(3) the base station supports only a multicast relay service; and (4) the base station supports a unicast relay service and a multicast relay service.

That the base station determines, according to the first relay service type indication information in the resource request message, whether to allocate the direct discovery resource to the remote terminal device includes:

when the base station does not support a relay service, or when the relay service type supported by the base station does not include the relay service type indicated by the first relay service type indication information, skipping allocating the direct discovery resource to the remote terminal device; or when the relay service type supported by the base station includes the relay service type indicated by the first relay service type indication information, allocating the direct discovery resource to the remote terminal device.

In an implementation of this embodiment, the base station may determine, according to a load status of the base station and the relay service type indicated by the first relay service type indication information, whether to allocate the direct discovery resource to the remote terminal device.

The load status of the base station includes but is not limited to a load status of the base station on a Uu interface and a load status that is of the base station and that exists when the base station allocates a resource to a D2D terminal device.

Further, the step that the base station determines, according to the load status of the base station and the relay service type indicated by the first relay service type indication information, whether to allocate the resource to the remote terminal device may be performed in the following manners (the following manners do not constitute a limitation):

When load of the base station on the Uu interface is not lower than a first threshold, and the resource allocated to the D2D terminal device is not lower than a second threshold, no resource is allocated to the remote terminal device for performing any type of relay service communication;

when load of the base station on the Uu interface is lower than a first threshold, and the resource allocated to the D2D terminal device is not lower than a second threshold, or when load of the base station on the Uu interface is not lower than a first threshold, and a resource allocated to the D2D terminal device is lower than a second threshold, only a resource for performing multicast relay communication is allocated to the remote terminal device; or when load of the base station on the Uu interface is lower than a first threshold, and the resource allocated to the D2D terminal device is lower than a second threshold, a resource for performing any type of relay service communication is allocated to the remote terminal device.

The first threshold may be a quantity of resources allocated by the base station to the terminal device on the Uu interface. The second threshold may be a quantity of resources allocated by the base station to the terminal device for performing D2D communication. Values of the first threshold and the second threshold may be set according to an actual requirement. No limitation is imposed herein.

Step 603: The base station sends a resource configuration message to the remote terminal device.

Optionally, when the base station allocates the direct discovery resource to the remote terminal device in step 602, the resource configuration message includes the direct discovery resource allocated to the remote terminal device. The resource configuration message may further include second relay service type indication information. The second relay service type indication information is used to indicate a type of a relay service in which the allocated direct discovery resource can be used.

Optionally, if the base station does not allocate the direct discovery resource to the remote terminal device in step 602, the resource configuration message may include indication information. The indication information is used to notify the remote terminal device that no resource is allocated or notify the remote terminal device that the base station does not support the relay service type currently requested by the remote terminal device. Optionally, if the base station does not allocate the direct discovery resource to the remote terminal device in step 602, the base station may not send a resource configuration message to the remote terminal device. If the remote terminal device does not receive, within a specified time, the resource configuration message sent by the base station, the remote terminal device considers that the base station does not support the relay service type indicated by the first relay service type indication information.

Step 604: The remote terminal device sends a relay direct discovery solicitation message to a relay terminal device by using the obtained direct discovery resource.

In this step, the remote terminal device sends the relay direct discovery solicitation message in a broadcast manner. Therefore, multiple relay terminal devices may receive the relay direct discovery solicitation message.

It should be noted that in step 601 to step 604, the remote terminal device is a first network device, the relay terminal device is a third network device, the base station is a second network device, a first communication resource is the direct discovery resource, and a relay message is the relay direct discovery solicitation message.

Step 605: The relay terminal device receives the relay direct discovery solicitation message, and returns a response message of the relay direct discovery solicitation message to the remote terminal device.

In step 605, a resource used when the relay terminal device returns the response message of the relay direct discovery solicitation message to the remote terminal device may be a direct discovery resource broadcast by the base station, or may be a direct discovery resource requested by the relay terminal device from the base station. A manner in which the relay terminal device requests the direct discovery resource from the base station is the same as a manner in which the remote terminal device requests the direct discovery resource from the base station. For details, refer to step 601 to step 603, and detailed description is omitted herein.

Step 606: The remote terminal device receives the response message that is of the relay direct discovery solicitation message and that is sent by the relay terminal device.

In step 605 and step 606, the relay terminal device is a first network device, the remote terminal device is a third network device, the base station is a second network device, a first communication resource is the direct discovery resource, and a relay message is the response message of the relay direct discovery solicitation message.

It should be noted that in step 601 to step 606, the remote terminal device discovers the relay terminal device by using a direct discovery process in the foregoing first mode. In another embodiment, the remote terminal device may discover the relay terminal device by using a direct discovery process in the foregoing second mode. In this case, step 601 to step 606 may be replaced with the following steps:

The relay terminal device sends, to the base station, a resource request message used to request a direct discovery resource, where the resource request message includes first relay service type indication information;

the base station allocates the direct discovery resource to the relay terminal device according to the received resource request message, and sends a resource configuration message to the relay terminal device, where the resource configuration message includes a first communication resource; and the relay terminal device receives the resource configuration message sent by the base station, and sends a relay usable announcement message to the remote terminal device by using the first communication resource; and after receiving the relay usable announcement message, the remote terminal device discovers the relay terminal device.

Step 607: The remote terminal device selects, as a serving relay terminal device, a relay terminal device from sending parties (that is, relay terminal devices) of the received response message of the relay direct discovery solicitation message.

The serving relay terminal device is a relay terminal device that actually provides a network service for the remote terminal device subsequently.

During implementation, response messages with which multiple relay terminal devices reply may be measured, and a relay terminal device corresponding to a response message with strongest signal strength is selected as the serving relay terminal device.

Step 608: The remote terminal device sends a resource request message to the base station, where the resource request message is used to request a direct communication resource.

The direct communication resource is used by the remote terminal device to send a unicast relay connection establishment request message or a multicast relay service request message to the relay terminal device. During implementation, the resource request message may be a message that includes sidelink UE information (SidelinkUEInformation).

The resource request message may include first relay service type indication information. For detailed description of the first relay service type indication information in step 608, refer to step 601. Details are not described herein again.

In an implementation of this embodiment of the present invention, step 608 may also include:

receiving, by the remote terminal device, a broadcast message sent by the base station, where the broadcast message includes capability information of the base station; and sending, by the remote terminal device, the resource request message to the base station according to the broadcast message.

For detailed description of the capability information of the base station and detailed description that the remote terminal device sends the resource request message to the base station according to the broadcast message, refer to step 601. Details are not described herein again.

Step 609: The base station receives the resource request message sent by the remote terminal device, and allocates the direct communication resource to the remote terminal according to first relay service type indication information in the received resource request message.

A specific implementation of step 609 is similar to a manner of allocating the direct discovery resource in step 602. Therefore, detailed description is omitted herein.

Step 610: The base station sends a resource configuration message to the remote terminal device, where the resource configuration message includes the direct communication resource.

Optionally, when the base station allocates the direct communication resource to the remote terminal device in step 609, the resource configuration message includes the direct communication resource allocated to the remote terminal device. The resource configuration message may further include second relay service type indication information. The second relay service type indication information is used to indicate a type of a relay service in which the allocated direct communication resource can be used.

Optionally, if the base station does not allocate the direct communication resource to the remote terminal device in step 609, the resource configuration message may include indication information. The indication information is used to notify the remote terminal device that no resource is allocated or notify the remote terminal device that the base station does not support a relay service type currently requested by the remote terminal device. Optionally, if the base station does not allocate the direct communication resource to the remote terminal device in step 609, the base station may not send a resource configuration message to the remote terminal device. If the remote terminal device does not receive, within a specified time, the resource configuration message sent by the base station, the remote terminal device considers that the base station does not support a relay service type indicated by the first relay service type indication information.

Optionally, the resource configuration message may further include data type indication information. The data type indication information is used to indicate a data type that can be borne in the resource. The data type includes control signaling and user data.

It should be noted that in step 608 to step 610, the remote terminal device is a first network device, the relay terminal device is a third network device, the base station is a second network device, a first communication resource is the direct communication resource, and a relay message is a direct communication message.

Step 611: The remote terminal device sends a unicast relay connection establishment request message or a multicast relay service request message to the serving relay terminal device by using the obtained direct communication resource.

Step 612: The serving relay terminal device receives the unicast relay connection establishment request message or the multicast relay service request message; determines whether to respond to the remote terminal device; and if determining to respond to the remote terminal device, the serving relay terminal device performs step 613; or if determining not to respond to the remote terminal device, the serving relay terminal device does not perform an operation.

The serving relay terminal device may determine, according to a condition of the serving relay terminal device, whether to respond to the remote terminal device. The condition of the serving relay terminal device includes but is not limited to a quantity of connected remote terminal devices that perform unicast communication, whether a multicast relay service is supported, whether an eMBMS relay service is supported, whether an SC-PTM relay service is supported, and the like.

Step 613: The serving relay terminal device obtains a direct communication resource, and sends a response message of the unicast relay connection establishment request message or a response message of the multicast relay service request message to the remote terminal device.

In step 613, the direct communication resource obtained by the serving relay terminal device may be a direct communication resource broadcast by the base station, or may be a direct communication resource requested by the serving relay terminal device from the base station. A manner in which the serving relay terminal device requests the direct communication resource from the base station is the same as a manner in which the remote terminal device requests the direct communication resource from the base station. For details, refer to step 608 to step 610, and detailed description is omitted herein.

Optionally, when the serving relay terminal device requests the direct communication resource, a resource request message sent to the base station includes first relay service type indication information. Optionally, if performing only a multicast relay service, the serving relay terminal device may return to an idle mode, and use the resource broadcast by the base station.

In step 613, the serving relay terminal device is a first network device, the remote terminal device is a third network device, the base station is a second network device, a first communication resource is the direct communication resource, and a relay message is the response message of the unicast relay connection establishment request message or the response message of the multicast relay service request message.

After step 613, the serving relay terminal device and the remote terminal device establish a D2D connection. After this step, the serving relay terminal device may provide, for the remote terminal device, a relay service requested by the remote terminal device.

When the remote terminal device requests a unicast relay service, the remote terminal device obtains the direct communication resource allocated by the base station, and sends, to the serving relay terminal device by using the obtained resource, data to be sent to the base station. The serving relay terminal device receives the data to be sent by the remote terminal device to the base station, and forwards the received data to the base station. Alternatively, the relay terminal device receives data to be sent by the base station to the remote terminal device, and forwards the received data to the remote terminal device by using the obtained direct communication resource.

It should be noted that one relay terminal device may perform unicast communication with multiple remote terminal devices, and content of communication performed between the relay terminal device and the multiple remote terminal devices may be different.

When the remote terminal device requests a multicast relay service, the serving relay terminal device forwards, to the remote terminal device, broadcast service data sent by the base station. In this case, the remote terminal device does not further need to send data, but only needs to receive data sent by the serving relay terminal device, so as to obtain the service data broadcast by the base station.

In addition, after the remote terminal device in the connected mode reports multicast relay service type indication information to the base station, if the remote terminal device does not have another connected-mode service, the remote terminal device may be switched to the idle mode to receive a multicast relay service. The remote terminal device may be switched to the idle mode by triggering the base station to send a connection release message to the remote terminal device.

It should be noted that in this embodiment, the present invention is described by using an example in which the remote terminal device obtains both the direct discovery resource and the direct communication resource by sending a resource request to the base station. In another embodiment, the remote terminal device may obtain at least one of the direct discovery resource or the direct communication resource from a message broadcast by the base station.

A resource request message sent by a first network device to a second network device carries first relay service type indication information, so that the second network device can determine a type of a relay service to be performed by the first network device by using a first communication resource, and can further determine, according to the type of the relay service to be performed by the first network device by using the first communication resource, whether to allocate a resource to the first network device. Therefore, resources can be more flexibly allocated, and resource utilization is improved.

FIG. 7 shows a flowchart of a communication resource allocation method according to an embodiment of the present invention. Referring to FIG. 7, the method includes the following steps.

Step 701: A first network device receives a resource configuration message sent by a second network device, where the resource configuration message includes a communication resource and first relay service type indication information, and the first relay service type indication information is used to indicate a type of a relay service in which the communication resource can be used.

The relay service type indicated by the first relay service type indication information may include three cases: (1) a unicast relay service; (2) a multicast relay service; or (3) a unicast relay service and a multicast relay service.

Step 702: The first network device obtains a first communication resource according to the resource configuration message, where the first communication resource is a resource used to send a relay message to a third network device, and the relay message includes at least one of a direct discovery message or a direct communication message.

The first communication resource obtained by the first network device may be a direct communication resource, or may be a direct discovery resource, or may be a direct communication resource and a direct discovery resource.

A type of a direct communication service in which a broadcast communication resource can be used is indicated in a resource configuration message broadcast by a second network device, so that a conflict with a resource used in another type of direct communication can be avoided, and communication quality and efficiency can be improved.

FIG. 8 shows a flowchart of a communication resource allocation method according to an embodiment of the present invention. Referring to FIG. 8, the method includes the following steps.

Step 801: A second network device generates a resource configuration message, where the resource configuration message includes a communication resource and first relay service type indication information, and the first relay service type indication information is used to indicate a type of a relay service in which the communication resource can be used.

The relay service type indicated by the first relay service type indication information may include three cases: (1) a unicast relay service; (2) a multicast relay service; or (3) a unicast relay service and a multicast relay service.

Step 802: The second network device broadcasts the resource configuration message.

A type of a direct communication service in which a broadcast communication resource can be used is indicated in a resource configuration message broadcast by a second network device, so that a conflict with a resource used in another type of direct communication can be avoided, and communication quality and efficiency can be improved.

In the embodiments shown in FIG. 7 and FIG. 8, the second network device may be a base station. When the first network device is a remote terminal device, the third network device may be a relay terminal device. When the first network device is a relay terminal device, the third network device may be a remote terminal device. The remote terminal device may be the remote terminal device shown in FIG. 1*a*, and the relay terminal device may be the relay terminal device shown in FIG. 1*a* and FIG. 1*b*.

FIG. 9 shows a schematic interaction diagram of a relay communication method according to an embodiment of the present invention. In the relay communication method, a communication resource allocation method provided in an embodiment of the present invention is used. Referring to FIG. 9, the relay communication method includes the following steps.

Step 901: A base station generates a resource configuration message.

The resource configuration message includes a communication resource and first relay service type indication information. The first relay service type indication information is used to indicate a type of a relay service in which the communication resource can be used. The relay service type indicated by the first relay service type indication information includes three cases: (1) a unicast relay service; (2) a multicast relay service; or (3) a unicast relay service and a multicast relay service.

The communication resource includes at least one of a direct discovery resource or a direct communication resource. The direct discovery resource is used to send a direct discovery message. The direct communication resource is used to send a direct communication message.

The direct discovery message includes at least one of the following messages: a relay direct discovery solicitation message, a response message of a relay direct discovery solicitation message, or a relay usable announcement message. The direct communication message includes at least one of the following messages: a unicast relay connection establishment request message, a response message of a unicast relay connection establishment request message, a multicast relay service request message, or a response message of a multicast relay service request message.

The resource configuration message further includes data type indication information. The data type indication information is used to indicate a data type that can be borne in the resource. The data type includes control signaling and user data.

Step 902: The base station broadcasts the resource configuration message.

During implementation, a resource configuration message that includes the direct discovery resource may be carried in a system information block 19 (SystemInformationBlock-Type 19, SIB19). A resource configuration message that includes the direct communication resource may be carried in a SIB18.

Optionally, the broadcast message may further include capability information of the base station. The capability information of the base station includes but is not limited to indication information indicating whether a relay service is supported, indication information indicating a supported relay service type, and indication information indicating a supported frequency. The broadcast message may include one or more types of the capability information of the base station.

For example, the resource configuration message in the SIB 19 may be represented in the following four forms:

In a first form:

service. Herein, Group is used to indicate multicast communication or one-to-many communication, and UC is used to indicate one-to-one communication or unicast communication. This is only an example, and does not constitute a limitation during implementation. The resource configuration message that is in the SIB18 and that includes the direct communication resource may be represented in a same manner. Detailed description is omitted herein.

Step 903: A remote terminal device receives the resource configuration message sent by the base station, and obtains a direct discovery resource according to the resource configuration message.

The direct discovery resource is used by the remote terminal device to send a relay direct discovery solicitation message such as a Solicitation message to a relay terminal device. During implementation, a resource request message may be a message that includes sidelink UE information (SidelinkUEInformation).

During implementation, when the remote terminal device is in an idle (RRC_IDLE) mode, the remote terminal device listens to the broadcast message of the base station.

The obtaining the direct discovery resource according to the resource configuration message broadcast by the base station may include:

when the relay service type indicated by the first relay service type indication information in the resource configuration message broadcast by the base station includes a type of a relay service that the remote terminal currently intends to perform, obtaining the direct discovery resource from the resource configuration message broadcast by the base station; or

```
    discConfigPS-13           SEQUENCE{
    discRxPoolPS-r13          SL-DiscRxPoolList-r12,
    discTx PoolPS-common-r13  SL-DiscRxPoolList-r12    OPTIONAL      --NEED
OR
    GroupRelayingAllowed      ENUMERATED{true}         OPTIONAL      --NEED
OR
    }                                                  OPTIONAL      --NEED OR.
In a second form:
    discConfigPS-13           SEQUENCE{
    discRxPoolPS-r13          SL-DiscRxPoolList-r12,
    discTx PoolPS-common-r13  SL-DiscRxPoolList-r12    OPTIONAL      --NEED
OR
    UCRelayingAllowed         ENUMERATED{true}         OPTIONAL      --NEED OR
    }                                                  OPTIONAL      --NEED OR.
In a third form:
    discConfigPS-13           SEQUENCE{
    discRxPoolPS-r13          SL-DiscRxPoolList-r12,
    discTx PoolPS-common-r13  SL-DiscRxPoolList-r12    OPTIONAL      --NEED
OR
    GroupUCRelaying           BIT STRING (SIZE (2))    OPTIONAL      --NEED
OR
    }                                                  OPTIONAL      --NEED OR.
In a fourth form:
    discConfigPS-13           SEQUENCE{
    discRxPoolPS-r13          SL-DiscRxPoolList-r12,
    discTx PoolPS-common-r13  SL-DiscRxPoolList-r12    OPTIONAL      --NEED
OR
    GroupUCRelayingAllowed    ENUMERATED{true}         OPTIONAL      --NEED
OR
    }                                                  OPTIONAL      --NEED OR.
```

In the first form, if a value corresponding to GroupRelayingAllowed is true, it indicates that an available relay service type is a multicast relay service. In the second form, if a value corresponding to UCRelayingAllowed is true, it indicates that an available relay service type is a unicast relay service. In the third form, if a value corresponding to GroupUCRelaying is true, it indicates that an available relay service type is a unicast relay service and a multicast relay when the resource configuration message broadcast by the base station does not include the foregoing resource, or when the relay service type indicated by the first relay service type indication information in the resource configuration message broadcast by the base station does not include a type of a relay service that the remote terminal device currently intends to perform, sending a resource request message to the base station, where the resource request is used to request the direct discovery resource.

For example, when the relay service type indicated by the first relay service type indication information in the resource configuration message broadcast by the base station is a unicast relay service, if the remote terminal device currently intends to perform a unicast relay service (that is, the relay service type indicated by the first relay service type indication information in the resource configuration message broadcast by the base station includes the type of the relay service that the remote terminal device currently intends to perform), the remote terminal device may directly use the resource broadcast by the base station; or if the base station currently requests a multicast relay service (that is, the relay service type indicated by the first relay service type indication information in the resource configuration message broadcast by the base station does not include the type of the relay service that the remote terminal device currently intends to perform), the remote terminal device sends a resource request message to the base station.

In this specification, a type of a service that a terminal device currently intends to perform may be understood as a service type in which the terminal device is interested.

For another example, when the relay service type indicated by the first relay service type indication information in the resource configuration message broadcast by the base station is a multicast relay service, if the remote terminal device currently intends to perform a multicast relay service, the remote terminal device may directly use the resource broadcast by the base station; or if the remote terminal device currently requests a unicast relay service, the remote terminal device sends a resource request message to the base station.

For another example, when the relay service type indicated by the first relay service type indication information in the resource configuration message broadcast by the base station is a unicast communication service and a multicast relay service, the remote terminal device may directly use the resource broadcast by the base station.

Step 904: The remote terminal device sends a relay direct discovery solicitation message to a relay terminal device by using the obtained direct discovery resource.

In step 903 and step 904, the relay terminal device is a first network device, the remote terminal device is a third network device, the base station is a second network device, a first communication resource is the direct discovery resource, and a relay message is the relay direct discovery solicitation message.

Step 905: The relay terminal device receives the relay direct discovery solicitation message, and returns a response message of the relay direct discovery solicitation message to the remote terminal device.

In step 905, a resource used when the relay terminal device returns the response message of the relay direct discovery solicitation message to the remote terminal may be a direct discovery resource broadcast by the base station, or may be a direct discovery resource requested by the relay terminal device from the base station. A manner in which the relay terminal device obtains the direct discovery resource according to a resource configuration message broadcast by the base station is the same as a manner in which the remote terminal device obtains the direct discovery resource according to the resource configuration message broadcast by the base station. For details, refer to step 903 to step 904, and detailed description is omitted herein.

Step 906: The remote terminal device receives the response message that is of the relay direct discovery solicitation message and that is sent by the relay terminal device.

In step 905 and step 906, the relay terminal device is a first network device, the remote terminal device is a third network device, the base station is a second network device, a first communication resource is the direct discovery resource, and a relay message is the response message of the relay direct discovery solicitation message.

It should be noted that in step 901 to step 906, the remote terminal device discovers the relay terminal device by using a direct discovery process in the foregoing first mode. In another embodiment, the remote terminal device may discover the relay terminal device by using a direct discovery process in the foregoing second mode. In this case, step 901 to step 906 may be replaced with the following steps:

The relay terminal device obtains a direct discovery resource according to a resource request message sent by the base station, where the resource request message includes first relay service type indication information; and the relay terminal device sends a relay usable announcement message such as an Announcement message to the remote terminal device by using the obtained direct discovery resource; and after receiving the relay usable announcement message, the remote terminal device discovers the relay terminal device.

Step 907: The remote terminal device selects, as a serving relay terminal device, a relay terminal device from sending parties (that is, relay terminal devices) of the received response message of the relay direct discovery solicitation message.

The serving relay terminal device is a relay terminal device that actually provides a network service for the remote terminal device subsequently.

During implementation, response messages with which multiple relay terminal devices reply may be measured, and a relay terminal device corresponding to a response message with strongest signal strength is selected as the serving relay terminal device.

Step 908: The remote terminal device receives a resource configuration message sent by the base station, and obtains a direct communication resource according to the resource configuration message.

The direct communication resource is used by the remote terminal device to send a unicast relay connection establishment request message or a multicast relay service request message to the relay terminal device. During implementation, the resource request may be a message that includes sidelink UE information (SidelinkUEInformation).

A manner in which the remote terminal device obtains the direct communication resource according to the resource configuration message is similar to a manner in which the remote terminal device obtains the direct discovery resource according to the resource configuration message in step 903. Detailed description is omitted herein.

Step 909: The remote terminal device sends a unicast relay connection establishment request message or a multicast relay service request message to the serving relay terminal device by using the obtained direct communication resource.

Step 910: The serving relay terminal device receives the unicast relay connection establishment request message or the multicast relay service request message; determines whether to respond to the remote terminal device; and if determining to respond to the remote terminal device, the serving relay terminal device performs step 911; or if determining not to respond to the remote terminal device, the serving relay terminal device does not perform an operation.

The serving relay terminal device may determine, according to a condition of the serving relay terminal device, whether to respond to the remote terminal device. The condition of the serving relay terminal device includes but is not limited to a quantity of connected remote terminal devices that perform unicast communication, whether a multicast relay service is supported, whether an eMBMS relay service is supported, whether an SC-PTM relay service is supported, and the like.

Step 911: The serving relay terminal device obtains a direct communication resource.

In step 911, the direct communication resource obtained by the serving relay terminal device may be a direct communication resource broadcast by the base station, or may be a direct communication resource requested by the serving relay terminal device from the base station. A manner in which the serving relay terminal device obtains the direct communication resource is similar to a manner in which the remote terminal device obtains the direct communication resource. For details, refer to step 908, and detailed description is omitted herein.

Step 912: The serving relay terminal device sends a response message to the remote terminal device by using the obtained the direct communication resource.

After step 912, the serving relay terminal device and the remote terminal device establish a D2D connection. After this step, the serving relay terminal may provide, for the remote terminal, a relay service requested by the remote terminal.

In step 911 and step 912, the serving relay terminal device is a first network device, the remote terminal device is a third network device, the base station is a second network device, a first communication resource is the direct communication resource, and a relay message is a response message of the unicast relay connection establishment request message or a response message of the multicast relay service request message.

A type of a direct communication service in which a broadcast communication resource can be used is indicated in a resource configuration message broadcast by a second network device, so that a conflict with a resource used in another type of direct communication can be avoided, and communication quality and efficiency can be improved.

FIG. 10 shows a flowchart of a communication resource allocation method according to an embodiment of the present invention. Referring to FIG. 10, the method includes the following steps:

Step 1001: A first network device receives a resource configuration message sent by a second network device, where the resource configuration message includes first frequency information supported by the second network device.

Step 1002: Send a second resource request message to the second network device when second frequency information carried in a first resource request message sent by the first network device last time does not match third frequency information, where the second resource request message includes the third frequency information, the third frequency information is frequency information that is configured by the first network device and that is used to send a communication message, and the third frequency information is included in the first frequency information; or send a third resource request message to the second network device when second frequency information carried in a first resource request message sent by the first network device last time does not match the first frequency information, where the third resource request message includes fourth frequency information, and the fourth frequency information is included in the first frequency information.

The third frequency information is determined by an upper-layer application in a terminal device. When the upper-layer application is started, the upper-layer application triggers the terminal device to request a resource from an eNB.

In this embodiment, the first network device may be a terminal device, and the second network device may be a base station. In this embodiment, the first resource request message is a resource request message sent to a serving eNB (that is, a source eNB) existing before handover is performed, and the second request message and the third resource request message are resource request messages sent to a serving eNB (that is, a target eNB) existing after handover is performed. In this embodiment, the communication message includes a direct communication message and/or a direct discovery message.

In this embodiment of the present invention, it is detected whether second frequency information carried in a first resource request message sent by a first network device last time matches third frequency information configured by the first network device, that is, it is detected whether a frequency of a resource currently requested by the first network device changes compared with a frequency of a resource requested by the first network device last time. If the frequency of the resource currently requested by the first network device changes, the first network device sends a second resource request message to a second network device to request a resource on a new frequency. Alternatively, it is detected whether second frequency information carried in a first resource request message sent by a first network device last time matches first frequency information currently supported by a second network device, that is, it is determined whether the second network device can provide a resource that is on a frequency and that is requested by the first network device last time. If the second network device cannot provide the resource that is on the frequency and that is requested by the first network device last time, the first network device sends a third resource request message to the second network device to request a resource on a new frequency, so as to ensure communication quality of a terminal device.

FIG. 11 shows a flowchart of a communication resource allocation method according to an embodiment of the present invention. In this embodiment, description is given by using an example in which a first network device is a terminal device and a second network device is an eNB. Referring to FIG. 11, the method includes the following steps.

Step 1101: A terminal device receives a resource configuration message sent by an eNB, where the resource configuration message includes first frequency information supported by the eNB.

The first frequency information includes at least one of a frequency list or a frequency index list. The frequency list includes at least one frequency value, and the frequency index list includes at least one frequency index value.

In actual application, the terminal device is usually handed over between different eNBs. Different eNBs may support different frequencies. That different frequencies are supported means that frequencies that can be used for resource allocation are partially or totally different. Different eNBs may be eNBs of different releases, or may be eNBs of a same release.

For example, a Rel-12 (a release) eNB supports a request, on one frequency, for a resource for sending a direct discovery message, and a Rel-13 (an enhanced release) eNB supports a request, on multiple frequencies, for a resource for sending a direct discovery message. For another example, multiple frequencies supported by two Rel-13 eNBs may be partially the same and partially different, or may be totally different.

Step 1102: The terminal device detects whether second frequency information carried in a first resource request message sent last time matches third frequency information, and detects whether the second frequency information carried in the first resource request message sent last time matches the first frequency information; and the terminal device performs step 1103 when the second frequency information carried in the first resource request message sent by the terminal device last time does not match the third frequency information, and the third frequency information is included in the first frequency information; or the terminal device performs step 1104 when the second frequency information carried in the first resource request message sent by the terminal device last time does not match the first frequency information.

The third frequency information is frequency information that is configured by the terminal device and that is used to send a communication message (that is, the third frequency information is a frequency in which the terminal device is interested when sending the communication message). The third frequency information is determined by an upper-layer application in the terminal device. When the upper-layer application is started, the upper-layer application triggers the terminal device to request a resource from the eNB.

The second frequency information includes at least one of a frequency list or a frequency index list. The third frequency information includes at least one of a frequency list or a frequency index list. The frequency list includes at least one frequency value, and the frequency index list includes at least one frequency index value.

Optionally, that the second frequency information carried in the first resource request message sent last time does not match the third frequency information includes at least one of the following cases:

The second frequency information is different from the third frequency information; or a first data structure used when the terminal device sends the first resource request message is different from a second data structure used when the terminal device sends the second resource request message.

Resource request messages supported by base stations of different releases usually have different data structures. That data structures are different includes but is not limited to a case in which a data structure that is in the first resource request message and that indicates the second frequency information is different from a data structure that is in the second resource request message and that indicates the third frequency information.

For example, in a resource request message (SidelinkUE-Information) supported by the Rel-12 eNB, a data structure that indicates frequency information is:

discTxResourceReq-12 INTEGER(1 . . . 63) OPTIONAL.

In a resource request message (SidelinkUEInformation) supported by the Rel-13 eNB, a data structure that indicates frequency information is:

carrierFreqDiscTx-r13 INTEGER(1 . . . maxFreq)OPTIONAL, and discTxResourceReq-13 INTEGER(1 . . . 63).

In this case, the Rel-12 eNB cannot parse a resource request message forwarded by the Rel-13 eNB, and therefore, the terminal device further needs to send a resource request message to the Rel-12 eNB.

Further, when UE is handed over from a Rel-13 eNB to a Rel-12 eNB, and is then handed over to a Rel-13 eNB, a resource request message is forwarded according to a sequence: Rel-13 eNB→Rel-12 eNB→Rel-13 eNB. When the UE does not request, from the Rel-12 eNB, a resource on a frequency supported by the Rel-12 eNB, and the UE is handed over to another Rel-13 eNB, if a requested frequency is the same as a frequency of an original Rel-13 eNB, the Rel-12 eNB does not forward the resource request message to the another Rel-13 eNB because the Rel-12 eNB cannot parse out information about another frequency. In this case, the terminal device further needs to send a resource request message to the another Rel-13 eNB.

Optionally, that the second frequency information carried in the first resource request message sent by the terminal device last time does not match the first frequency information includes at least one of the following cases:

The second frequency information is not included in the first frequency information; or partial information of the second frequency information is not included in the first frequency information.

Step 1103: The terminal device sends a second resource request message to the eNB, where the second resource request message includes the third frequency information.

Step 1104: Send a third resource request message to the eNB, where the third resource request message includes fourth frequency information, and the fourth frequency information is included in the first frequency information.

The fourth frequency information includes at least one of a frequency list or a frequency index list.

In this embodiment, the first resource request message is a resource request message sent to a serving eNB (that is, a source eNB) existing before handover is performed, and the second request message and the third resource request message are resource request messages sent to a serving eNB (that is, a target eNB) existing after handover is performed.

When the terminal device is handed over from the source eNB to the target eNB, the source eNB forwards, to the target eNB, the first resource request message sent by the UE. If a frequency supported by the source eNB is different from a frequency supported by the target eNB, the terminal device cannot obtain a resource from the target eNB. Therefore, when the second frequency information carried in the first resource request message is different from the frequency supported by the target eNB, the terminal device selects one or more frequencies from the frequency supported by the target eNB, and sends the third resource request message to the target eNB. The third resource request message includes information about the selected frequency, that is, the fourth frequency information. If a frequency indicated by the second frequency information carried in the first resource request message is included in the frequency supported by the target eNB, the terminal device may not send a resource request message to the target eNB.

It should be noted that all resource request messages in this embodiment may be messages that include SidelinkUEInformation.

A case in which the terminal device is handed over between eNBs of different releases and a case in which the terminal device is handed over between eNBs of a same release are separately described in the following by using examples.

1. The terminal device is handed over between the eNBs of different releases.

After the terminal device sends the first resource request message to a Rel-13 eNB, the terminal device is handed over to a Rel-12 eNB. Supported frequencies on which the Rel-13 eNB and Rel-12 provide communication resources, and a frequency of a resource requested by the terminal device fall into the following cases shown in Table 1:

TABLE 1

| Supported/requested frequency | Rel-12 eNB | Rel-13 eNB | Resource request message |
|---|---|---|---|
| Case 1 | F1 | F1/F2/F3 | F1 |
| Case 2 | F1 | F1/F2/F3 | F2 |

Case 1: The terminal device requests a resource on a frequency F1 from the Rel-13 eNB, and a frequency of a requested resource is unchanged after handover is performed.

In case 1, if F1 is serving frequencies of the Rel-12 eNB and the Rel-13 eNB, data structures used when the terminal device sends resource request messages to the two types of eNBs are the same. Therefore, a resource request message forwarded by the Rel-13 eNB to the Rel-12 eNB can be parsed by the Rel-12 eNB, and the terminal device does not further need to send a resource request message to the Rel-12 eNB. It should be noted that in this embodiment of the present invention, a serving frequency is a frequency on which an eNB communicates with the terminal device, and a frequency supported by the eNB is a frequency on which the eNB can allocate a communication resource to the terminal device. The serving frequency of the eNB is included in the frequency supported by the eNB, that is, the eNB can not only allocate a resource on the serving frequency of the eNB to the terminal device, but also allocate a resource on a frequency different from the serving frequency of the eNB to the terminal device.

In case 1, if F1 is a serving frequency of the Rel-12 eNB, but is not a serving frequency of Rel-13 eNB, data structures used when the terminal device sends resource request messages to the two types of eNBs are different. Therefore, a resource request message forwarded by the Rel-13 eNB to the Rel-12 eNB cannot be parsed by the Rel-12 eNB. In this case, the terminal device needs to send a resource request message to the Rel-12 eNB. Alternatively, the terminal device is handed over from the Rel-12 eNB to a Rel-13 eNB, and a resource request message forwarded by the Rel-12 eNB to the Rel-13 eNB cannot be parsed by the Rel-13 eNB. In this case, the terminal device needs to send a resource request message to the Rel-13 eNB.

Case 2: If the terminal device originally requests a resource on a frequency F2 from the Rel-13 eNB (that is, the second frequency information carried in the first resource request includes the frequency F2), because the Rel-12 eNB existing after handover is performed does not support the frequency F2, the terminal device needs to send the third resource request message to the Rel-12 eNB to request a resource on a frequency F1 supported by the Rel-12 eNB, that is, the fourth frequency information carried in the third resource request message includes the frequency F1.

2. The terminal device is handed over between the eNBs of a same release.

The terminal device is handed over between Rel-13 eNBs (it is assumed that the terminal device is handed over from an eNB1 to an eNB2). However, multiple frequencies supported by different eNBs may not be totally the same, as shown in Table 2:

TABLE 2

| Supported/requested frequency | Rel-13 eNB1 | Rel-13 eNB2 | Resource request message |
|---|---|---|---|
| Case 1 | F1/F4/F5 | F1/F2/F3 | F1 |
| Case 2 | F1/F4/F5 | F1/F2/F3 | F4 |

Case 1: A frequency of a resource requested by the terminal device is a frequency F1 both before and after the terminal device is handed over. In case 1, if F1 is serving frequencies of the eNB1 and the eNB2 or locations of F1 in frequency lists broadcast by the eNB1 and the eNB2 are the same, and both the eNB1 existing before handover is performed and the eNB2 existing after handover is performed support the frequency F1, the terminal device does not need to send a resource request message to the eNB2.

In case 1, if F1 is a serving frequency of the eNB1 but is not a serving frequency of the eNB2, or if F1 is not serving frequencies of the eNB1 and the eNB2, but locations of F1 in frequency lists broadcast by the eNB1 and the eNB2 are different, and both the eNB1 existing before handover is performed and the eNB2 existing after handover is performed support the frequency F1, the terminal device needs to send a resource request message to the eNB2 because a data structure or content used when the terminal device sends a resource request message that carries F1 information changes.

A case in which the locations of F1 in the frequency lists broadcast by the eNB1 and the eNB2 are the same or different is described by using examples in the following Table 3 and Table 4:

TABLE 3

| Frequency list broadcast by the eNB1 | |
|---|---|
| Frequency | Index |
| F2 | 1 |
| F1 | 2 |
| F3 | 3 |
| F4 | 4 |

TABLE 4

| Frequency list broadcast by the eNB2 | |
|---|---|
| Frequency | Index |
| F3 | 1 |
| F1 | 2 |
| F2 | 3 |

When the terminal device reports frequency information to a base station, if an index value is used, a case in which a same frequency is reported but different index values are used occurs. In this case, resource request messages sent on reported frequencies are different, and the terminal device further needs to send a resource request message. For example, in the foregoing tables, index values of F1 are both "2", that is, F1 is at a same location (starting from the top of the lists) in the lists, but index values of F2 are different, that is, F2 is at different locations in different lists.

Case 2: A frequency of a resource requested by the terminal device from the eNB1 before the terminal device is handed over is a frequency F4, and the frequency is not included in frequencies supported by the eNB existing after handover is performed. In this case, the terminal device needs to send the second resource request message to the eNB to change a frequency.

In this embodiment of the present invention, it is detected whether second frequency information carried in a first resource request message sent last time matches third frequency information configured by a first network device, that is, it is detected whether a frequency of a resource currently requested by the first network device changes compared with a frequency of a resource requested last time. If the frequency of the resource currently requested by the first network device changes, the first network device sends a second resource request message to a second network device to request a resource on a new frequency. Alternatively, it is detected whether second frequency information carried in a first resource request message sent by a first network device last time matches first frequency information currently supported by a second network device, that is, it is determined whether the second network device can provide a resource that is on a frequency and that is requested by the first network device last time. If the second network device cannot provide the resource that is on the frequency and that is requested by the first network device last time, the first network device sends a third resource request message to the second network device to request a resource on a new frequency, so as to ensure communication quality of a terminal device.

Figure 12:
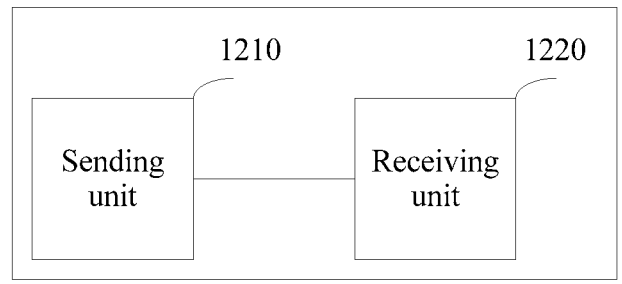
FIG. 12 is a schematic structural diagram of a communication resource allocation apparatus according to an embodiment of the present invention.

FIG. 12 shows a block diagram of a communication resource allocation apparatus according to an embodiment of the present invention. By means of software, hardware, or a combination of software and hardware, the communication resource allocation apparatus may be implemented as all or a part of the first network device in the embodiments shown in FIG. 4 to FIG. 6. Referring to FIG. 12, the communication resource allocation apparatus may include a sending unit 1210 and a receiving unit 1220.

The sending unit 1210 is configured to send a resource request message to a second network device. The resource request message is used to request a first communication resource. The first communication resource is a resource for sending a relay message to a third network device by the first network device. The relay message includes at least one of a direct discovery message or a direct communication message. The resource request message includes first relay service type indication information. The first relay service type indication information is used to indicate a type of a relay service to be performed by the first network device by using the first communication resource.

The receiving unit 1220 is configured to receive a resource configuration message sent by the second network device. The resource configuration message includes the first communication resource allocated by the second network device to the first network device according to the resource request message.

Optionally, in an implementation of this embodiment of the present invention, the receiving unit 1220 is further configured to receive a broadcast message sent by the second network device. The broadcast message includes capability information of the second network device. The capability information of the second network device includes at least one of indication information indicating whether a relay service is supported or indication information indicating a supported relay service type.

The sending unit 1210 is configured to send the resource request message to the second network device according to the capability information of the second network device.

Figure 13:
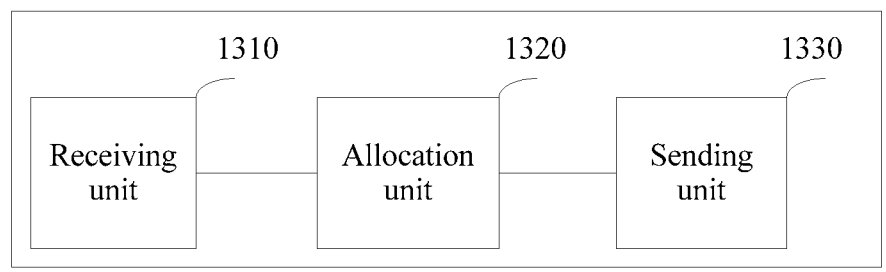
FIG. 13 is a schematic structural diagram of another communication resource allocation apparatus according to an embodiment of the present invention.

FIG. 13 shows a block diagram of a communication resource allocation apparatus according to an embodiment of the present invention. By means of software, hardware, or a combination of software and hardware, the communication resource allocation apparatus may be implemented as all or a part of the second network device in the embodiments shown in FIG. 4 to FIG. 6. Referring to FIG. 13, the communication resource allocation apparatus may include a receiving unit 1310, an allocation unit 1320, and a sending unit 1330.

The receiving unit 1310 is configured to receive a resource request message sent by a first network device. The resource request message is used to request a first communication resource. The first communication resource is a resource for sending a relay message to a third network device by the first network device. The relay message includes at least one of a direct discovery message or a direct communication message. The resource request message includes first relay service type indication information. The first relay service type indication information is used to indicate a type of a relay service to be performed by the first network device by using the first communication resource.

The allocation unit 1320 is configured to allocate the first communication resource to the first network device according to the resource request message.

The sending unit 1330 is configured to send a resource configuration message to the first network device. The resource configuration message includes the first communication resource.

In the embodiments shown in FIG. 12 and FIG. 13, the first communication resource includes at least one of a direct discovery resource or a direct communication resource, the direct discovery resource is used to send a direct discovery message, and the direct communication resource is used to send a direct communication message.

The direct discovery message includes at least one of the following messages: a relay direct discovery solicitation message, a response message of a relay direct discovery solicitation message, or a relay usable announcement message. The direct communication message includes at least one of the following messages: a unicast relay connection establishment request message, a response message of a unicast relay connection establishment request message, a multicast relay service request message, or a response message of a multicast relay service request message.

Optionally, the first relay service type indication information uses an explicit indication manner and/or an implicit indication manner.

When using the explicit indication manner, the first relay service type indication information includes at least one type of the following information: indication information indicating a unicast relay service, indication information indicating a multicast relay service, or indication information indicating a unicast relay service and a multicast relay service.

When using the implicit indication manner, the first relay service type indication information includes at least one type of the following information:

a unicast address for sending unicast relay data, a multicast address for sending multicast relay data, or a unicast address for sending unicast relay data and a multicast address for sending multicast relay data.

Optionally, the resource configuration message further includes second relay service type indication information. The second relay service type indication information is used to indicate a type of a relay service in which the first communication resource can be used.

Optionally, when the first communication resource is a direct communication resource, the resource configuration message further includes data type indication information, the data type indication information is used to indicate a data type that can be borne in the resource, and the data type includes control signaling and user data.

Figure 14:
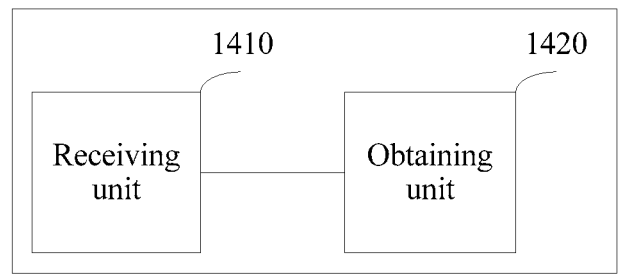
FIG. 14 is a schematic structural diagram of still another communication resource allocation apparatus according to an embodiment of the present invention.

FIG. 14 shows a block diagram of a communication resource allocation apparatus according to an embodiment of the present invention. By means of software, hardware, or a combination of software and hardware, the communication resource allocation apparatus may be implemented as all or a part of the first network device in the embodiments shown in FIG. 7 to FIG. 9. Referring to FIG. 14, the communication resource allocation apparatus may include:

a receiving unit 1410, configured to receive a resource configuration message sent by a second network device, where the resource configuration message includes a communication resource and first relay service type indication information, and the first relay service type indication information is used to indicate a type of a relay service in which the communication resource can be used; and an obtaining unit 1420, configured to obtain a first communication resource according to the resource configuration message received by the receiving unit, where the first communication resource is a resource used to send a relay message to a third network device, and the relay message includes at least one of a direct discovery message or a direct communication message.

Further, the obtaining unit 1420 is configured to: when the relay service type indicated by the first relay service type indication information in the resource configuration message received by the receiving unit 1410 includes a relay service type currently requested by the first network device, obtain the first communication resource from the communication resource configured in the resource configuration message; or when the relay service type indicated by the first relay service type indication information in the resource configuration message received by the receiving unit 1410 does not include a relay service type currently requested by the first network device, send a resource request message to the second network device, where the resource request message is used to request the first communication resource.

Figure 15:
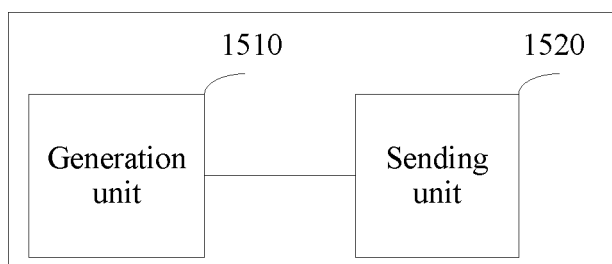
FIG. 15 is a schematic structural diagram of yet another communication resource allocation apparatus according to an embodiment of the present invention.

FIG. 15 shows a block diagram of a communication resource allocation apparatus according to an embodiment of the present invention. By means of software, hardware, or a combination of software and hardware, the communication resource allocation apparatus may be implemented as all or a part of the second network device in the embodiments shown in FIG. 7 to FIG. 9. Referring to FIG. 15, the communication resource allocation apparatus may include:

a generation unit 1510, configured to generate a resource configuration message, where the resource configuration message includes a communication resource and first relay service type indication information, and the first relay service type indication information is used to indicate a type of a relay service in which the communication resource can be used; and a sending unit 1520, configured to broadcast the resource configuration message generated by the generation unit.

In the embodiments shown in FIG. 14 and FIG. 15, the communication resource includes at least one of a direct discovery resource or a direct communication resource, the direct discovery resource is used to send a direct discovery message, and the direct communication resource is used to send a direct communication message.

The direct discovery message includes at least one of the following messages: a relay direct discovery solicitation message, a response message of a relay direct discovery solicitation message, or a relay usable announcement message. The direct communication message includes at least one of the following messages: a unicast relay connection establishment request message, a response message of a unicast relay connection establishment request message, a multicast relay service request message, or a response message of a multicast relay service request message.

Optionally, when the first communication resource is a direct communication resource, the resource configuration message further includes data type indication information, the data type indication information is used to indicate a data type that can be borne in the resource, and the data type includes control signaling and user data.

Figure 16:
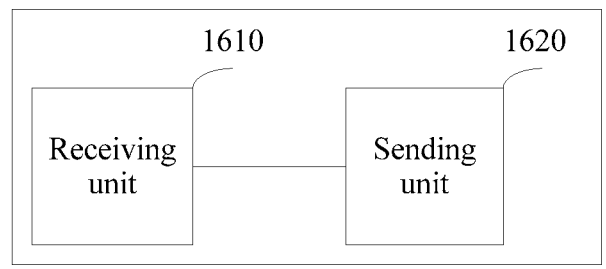
FIG. 16 is a schematic structural diagram of a communication resource allocation apparatus according to an embodiment of the present invention.

FIG. 16 shows a block diagram of a communication resource allocation apparatus according to an embodiment of the present invention. By means of software, hardware, or a combination of software and hardware, the communication resource allocation apparatus may be implemented as all or a part of the first network device in the embodiments shown in FIG. 10 and FIG. 11. Referring to FIG. 16, the communication resource allocation apparatus may include:

a receiving unit 1610, configured to receive a resource configuration message sent by a second network device, where the resource configuration message includes first frequency information supported by the second network device; and a sending unit 1620, configured to: send, by the first network device, a second resource request message to the second network device when second frequency information carried in a first resource request message sent by the first network device last time does not match third frequency information, and the third frequency information is included in the first frequency information, where the second resource request message includes the third frequency information, and the third frequency information is frequency information that is configured by the first network device and that is used to send a communication message; or send, by the first network device, a third resource request message to the second network device when second frequency information carried in a first resource request message sent by the first network device last time does not match the first frequency information, where the third resource request message includes fourth frequency information, and the fourth frequency information is included in the first frequency information.

That the second frequency information carried in the first resource request message sent by the first network device last time does not match the third frequency information includes at least one of the following cases:

The second frequency information is different from the third frequency information; or a first data structure used when the first network device sends the first resource request message is different from a second data structure used when the first network device sends the second resource request message.

That the second frequency information carried in the first resource request message sent by the first network device last time does not match the first frequency information includes at least one of the following cases:

The second frequency information is not included in the first frequency information; or partial information of the second frequency information is not included in the first frequency information.

The first frequency information includes at least one of a frequency list or a frequency index list.

The second frequency information includes at least one of a frequency list or a frequency index list.

The third frequency information includes at least one of a frequency list or a frequency index list.

The fourth frequency information includes at least one of a frequency list or a frequency index list.

The frequency list includes at least one frequency value, and the frequency index list includes at least one frequency index value.

Figure 17:
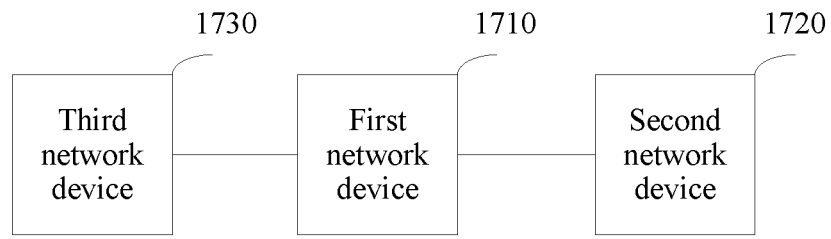
FIG. 17 is a schematic structural diagram of a communications system according to an embodiment of the present invention.

FIG. 17 shows a block diagram of a communications system according to an embodiment of the present invention. Referring to FIG. 17, the communications system includes a first network device 1710, a second network device 1720, and a third network device 1730.

The first network device 1710 is configured to send a resource request message to the second network device 1720. The resource request message is used to request a first communication resource. The first communication resource is a resource for sending a relay message to the third network device 1730 by the first network device 1710. The relay message includes at least one of a direct discovery message or a direct communication message. The resource request message includes first relay service type indication information. The first relay service type indication information is used to indicate a type of a relay service to be performed by the first network device 1710 by using the first communication resource.

The second network device 1720 is configured to: receive the resource request message sent by the first network device 1710; allocate the first communication resource to the first network device 1710 according to the resource request message; and send a resource configuration message to the first network device 1710. The resource configuration message includes the first communication resource.

The first network device 1710 is further configured to receive the resource configuration message sent by the second network device 1720.

For detailed actions and functions of the first network device and the second network device in this embodiment, refer to the method embodiments shown in FIG. 4 to FIG. 6. Detailed description is omitted herein.

Figure 18:
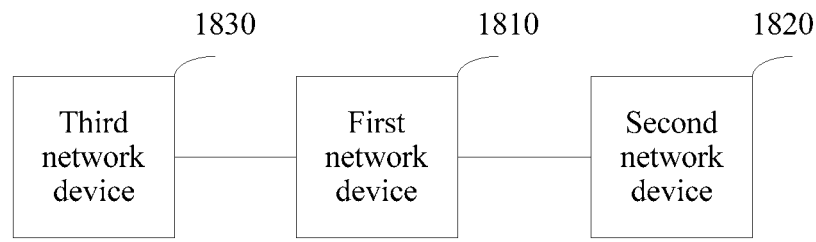
FIG. 18 is a schematic structural diagram of a communications system according to an embodiment of the present invention.

FIG. 18 shows a block diagram of a communications system according to an embodiment of the present invention. Referring to FIG. 18, the communications system includes a first network device 1810, a second network device 1820, and a third network device 1830.

The second network device 1820 is configured to: generate a resource configuration message, where the resource configuration message includes a communication resource and first relay service type indication information, and the first relay service type indication information is used to indicate a type of a relay service in which the communication resource can be used; and broadcast the resource configuration message.

The first network device 1810 is configured to: receive the resource configuration message sent by the second network device 1820, and obtain a first communication resource according to the resource configuration message. The first communication resource is a resource used to send a relay message to the third network device. The relay message includes at least one of a direct discovery message or a direct communication message.

For detailed actions and functions of the first network device and the second network device in this embodiment, refer to the method embodiments shown in FIG. 7 to FIG. 9. Detailed description is omitted herein.

Figure 19:
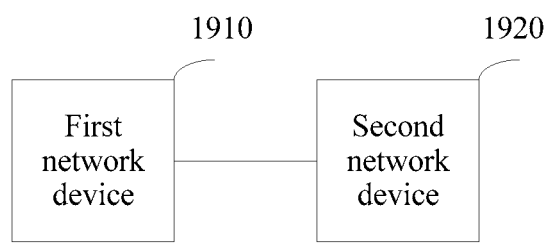
FIG. 19 is a schematic structural diagram of a communications system according to an embodiment of the present invention.

FIG. 19 shows a block diagram of a communications system according to an embodiment of the present invention. Referring to FIG. 19, the communications system includes a first network device 1910 and a second network device 1920.

The second network device 1920 is configured to broadcast a resource configuration message. The resource configuration message includes first frequency information supported by the second network device 1920.

The first network device 1910 is configured to: receive the resource configuration message sent by the second network device 1920; and send, by the first network device, a second resource request message to the second network device 1920 when second frequency information carried in a first resource request message sent by the first network device 1910 last time does not match third frequency information, and the third frequency information is included in the first frequency information, where the second resource request message includes the third frequency information, and the third frequency information is frequency information that is configured by the first network device 1910 and that is used to send a communication message; or send, by the first network device 1910, a third resource request message to the second network device 1920 when second frequency information carried in a first resource request message sent by the first network device 1910 last time does not match the first frequency information, where the third resource request message includes fourth frequency information, and the fourth frequency information is included in the first frequency information.

For detailed actions and functions of the first network device and the second network device in this embodiment, refer to the method embodiments shown in FIG. 10 and FIG. 11. Detailed description is omitted herein.

It should be noted that, when the communication resource allocation apparatus provided in the embodiments allocates a communication resource, division of the functional modules is only used as an example for description. In actual application, the functions can be allocated to different functional modules for implementation according to a requirement. That is, an internal structure of a device is divided into different functional modules to implement all or some of the functions described above.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are only examples of the embodiments of the present invention, but are not intended to limit the present invention. Any modification, equivalent replacement, and improvement made without departing from the spirit and principle of the present invention shall fall within the protection scope of the present invention.

What is claimed is:

1. A communication resource allocation method, comprising:

sending, by a first network device, a resource request message to a second network device, wherein the resource request message is used to request a first communication resource, the first communication resource is a resource for sending a relay message to a third network device by the first network device, the relay message is used for proximity service communication between the first network device and the third network device, the resource request message comprises first relay service type indication information, the first relay service type indication information is used to indicate a type of a relay service to be performed by the first network device by using the first communication resource, and the type of the relay service indicated by the first relay service type indication information is one or more of: a unicast relay service and a multicast relay service; and receiving, by the first network device, a resource configuration message sent by the second network device, wherein the resource configuration message comprises the first communication resource allocated by the second network device to the first network device according to the resource request message, wherein:
the first network device is a remote terminal, the second network device is base station, and the third network device is a relay terminal; or
the first network device is a relay terminal, the second network device is base station, and the third network device is a remote terminal.

2. The method according to claim 1, wherein the first communication resource comprises a direct communication resource used to send the relay message.

3. The method according to claim 1 wherein
the first relay service type indication information comprises at least one type of the following information: indication information indicating the unicast relay service, indication information indicating the multicast relay service, or indication information indicating the unicast relay service and the multicast relay service; or
wherein the first relay service type indication information comprises at least one type of the following information:
a unicast address for sending unicast relay data, a multicast address for sending multicast relay data, or a unicast address for sending unicast relay data and a multicast address for sending multicast relay data.

4. The method according to claim 1, wherein the sending, by the first network device, the resource request message comprising the first relay service type indication information occurs prior to device-to-device (D2D) communication between the remote terminal and the relay terminal.

5. A communication resource allocation method, comprising:
receiving, by a second network device, a resource request message from a first network device, wherein the resource request message is used to request a first communication resource, the first communication resource is a resource for sending a relay message to a third network device by the first network device, the relay message is used for proximity service communication between the first network device and the third network device, the resource request message comprises first relay service type indication information, the first relay service type indication information is used to indicate a type of a relay service to be performed by the first network device by using the first communication resource, and the type of the relay service indicated by the first relay service type indication information is one or more of: a unicast relay service and a multicast relay service;

allocating, by the second network device, the first communication resource to the first network device according to the resource request message; and sending, by the second network device, a resource configuration message to the first network device, wherein the resource configuration message comprises the first communication resource, wherein:
the first network device is a remote terminal, the second network device is base station, and the third network device is a relay terminal; or
the first network device is a relay terminal, the second network device is base station, and the third network device is a remote terminal.

6. The method according to claim 5, wherein the first communication resource comprises a direct communication resource used to send the relay message.

7. The method according to claim 5, wherein
the first relay service type indication information comprises at least one type of the following information: indication information indicating the unicast relay service, indication information indicating the multicast relay service, or indication information indicating the unicast relay service and the multicast relay service; or
wherein the first relay service type indication information comprises at least one type of the following information:
a unicast address for sending unicast relay data, a multicast address for sending multicast relay data, or a unicast address for sending unicast relay data and a multicast address for sending multicast relay data.

8. The method according to claim 5, wherein the receiving, by the second network device, the resource request message comprising the first relay service type indication information occurs prior to device-to-device (D2D) communication between the remote terminal and the relay terminal.

9. A communication resource allocation apparatus, applied to a first network device, the apparatus comprising:
a transmitter, configured to send a resource request message to a second network device, wherein the resource request message is used to request a first communication resource, the first communication resource is a resource for sending a relay message to a third network device by the first network device, the relay message used for proximity service communication between the first network device and the third network device, the resource request message comprises first relay service type indication information, the first relay service type indication information is used to indicate a type of a relay service to be performed by the first network device by using the first communication resource, and the type of the relay service indicated by the first relay service type indication information is one or more of: a unicast relay service and a multicast relay service; and a receiver, configured to receive a resource configuration message sent by the second network device, wherein the resource configuration message comprises the first communication resource allocated by the second network device to the first network device according to the resource request message, wherein:
the first network device is a remote terminal, the second network device is base station, and the third network device is a relay terminal; or the first network device is a relay terminal, the second network device is base station, and the third network device is a remote terminal.

10. The apparatus according to claim 9, wherein the first communication resource comprises a direct communication resource used to send the relay message.

11. The apparatus according to claim 9, wherein the first relay service type indication information comprises at least one type of the following information: indication information indicating the unicast relay service, indication information indicating the multicast relay service, or indication information indicating the unicast relay service and the multicast relay service; or wherein the first relay service type indication information comprises at least one type of the following information:

a unicast address for sending unicast relay data, a multicast address for sending multicast relay data, or a unicast address for sending unicast relay data and a multicast address for sending multicast relay data.

12. The apparatus according to claim 9, wherein the transmitter is configured to send the resource request message comprising the first relay service type indication information to the second network device prior to device-to-device (D2D) communication between the remote terminal and the relay terminal.

13. A communication resource allocation apparatus, applied to a second network device, the apparatus comprising:

a receiver, configured to receive a resource request message sent by a first network device, wherein the resource request message is used to request a first communication resource, the first communication resource is a resource for sending a relay message to a third network device by the first network device, the relay message is used for proximity service communication between the first network device and the third network device, the resource request message comprises first relay service type indication information, the first relay service type indication information is used to indicate a type of a relay service to be performed by the first network device by using the first communication resource, and the type of the relay service indicated by the first relay service type indication information is one or more of: a unicast relay service and a multicast relay service;

a processor, configured to allocate the first communication resource to the first network device according to the resource request message received by the receiver; and a transmitter, configured to send a resource configuration message to the first network device, wherein the resource configuration message comprises the first communication resource allocated by the processor, wherein:
the first network device is a remote terminal, the second network device is base station, and the third network device is a relay terminal; or the first network device is a relay terminal, the second network device is base station, and the third network device is a remote terminal.

14. The apparatus according to claim 13, wherein the first communication resource comprises a direct communication resource used to send the relay message.

15. The apparatus according to claim 13, wherein the first relay service type indication information comprises at least one type of the following information: indication information indicating the unicast relay service, indication information indicating the multicast relay service, or indication information indicating the unicast relay service and the multicast relay service; or wherein the first relay service type indication information comprises at least one type of the following information:

a unicast address for sending unicast relay data, a multicast address for sending multicast relay data, or a unicast address for sending unicast relay data and a multicast address for sending multicast relay data.

16. The apparatus according to claim 13, wherein the receiver is configured to receive the resource request message comprising the first relay service type indication information sent by the first network device prior to device-to-device (D2D) communication between the remote terminal and the relay terminal.

* * * * *

UNITED STATES PATENT AND TRADEMARK OFFICE
CERTIFICATE OF CORRECTION

| | |
|---|---|
| PATENT NO. | : 10,917,778 B2 |
| APPLICATION NO. | : 16/054345 |
| DATED | : February 9, 2021 |
| INVENTOR(S) | : Wang et al. |

It is certified that error appears in the above-identified patent and that said Letters Patent is hereby corrected as shown below:

On the Title Page

Page 2, Item (56) Other Publications Citation No. 3: "dated Dec. 1, 2020." should read -- dated December 21, 2020 --.

Signed and Sealed this
Fifth Day of July, 2022

Katherine Kelly Vidal
*Director of the United States Patent and Trademark Office*